(12) United States Patent
Zainuddin et al.

(10) Patent No.: US 12,462,877 B2
(45) Date of Patent: Nov. 4, 2025

(54) PROGRAM PULSE DURATION INCREASE FOR NAND PROGRAM FAILURE

(71) Applicant: Sandisk Technologies, Inc., Milpitas, CA (US)

(72) Inventors: Abu Naser Zainuddin, Milpitas, CA (US); Parth Amin, Livermore, CA (US); Xiaochen Zhu, Milpitas, CA (US); Jiahui Yuan, Fremont, CA (US); Anubhav Khandelwal, San Jose, CA (US); Vishwanath Basavaegowda Shanthakumar, Milpitas, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 201 days.

(21) Appl. No.: 18/356,760

(22) Filed: Jul. 21, 2023

(65) Prior Publication Data
US 2024/0127891 A1   Apr. 18, 2024

Related U.S. Application Data

(60) Provisional application No. 63/416,844, filed on Oct. 17, 2022.

(51) Int. Cl.
| | | |
|---|---|---|
| *G11C 16/10* | (2006.01) | |
| *G11C 16/04* | (2006.01) | |
| *G11C 16/16* | (2006.01) | |
| *G11C 16/34* | (2006.01) | |
| *H01L 25/065* | (2023.01) | |

(52) U.S. Cl.
CPC .......... *G11C 16/10* (2013.01); *G11C 16/0483* (2013.01); *G11C 16/16* (2013.01); *G11C 16/3459* (2013.01); *H01L 25/0657* (2013.01); *H01L 2225/06562* (2013.01)

(58) Field of Classification Search
CPC ..... G11C 16/10; G11C 16/0483; G11C 16/16; G11C 16/3459; G11C 16/08; G11C 16/32; G11C 11/5628; H01L 25/0657; H01L 2225/06562; H01L 2225/06506; H01L 2225/0651; H01L 2225/06513; H01L 2225/06517; H01L 25/18
See application file for complete search history.

(56) References Cited

U.S. PATENT DOCUMENTS

| | | |
|---|---|---|
| 8,982,626 B2 | 3/2015 | Dong et al. |
| 9,015,407 B1 | 4/2015 | Dusija et al. |
| 9,229,856 B2 | 1/2016 | Avila et al. |
| 9,269,446 B1 * | 2/2016 | Magia ............... H10B 43/27 |

(Continued)

*Primary Examiner* — Jerome Leboeuf
*Assistant Examiner* — Christopher Lane Reece
(74) *Attorney, Agent, or Firm* — Pearl Cohen Zedek Latzer Baratz LLP

(57) ABSTRACT

A duration of a program pulse used to program non-volatile memory cells such as NAND may be increased responsive to a programming failure using a shorter duration program pulse. The duration of at least one program pulse may be increased for at least one group of memory cells in response to a failure to program a group using a default program pulse duration. The group that experiences the increased duration program pulse may be the same group for which the program operation failed using the shorter program pulse or may be a different group than the group for which the program operation failed using the shorter program pulse.

13 Claims, 18 Drawing Sheets

800

| Execute a first program operation that programs data into a first group of NAND memory cells in an erase group using a first duration for program pulses | ─ 802 |

↓

| Execute a second program operation that programs data into at least one group of NAND memory cells in the erase group using a second duration for one or more program pulses that is longer than the first duration responsive to a failure in the first program operation | ─ 804 |

(56) References Cited

U.S. PATENT DOCUMENTS

| | | | |
|---|---|---|---|
| 9,324,419 B2* | 4/2016 | Pang | G11C 16/10 |
| 9,437,318 B2 | 9/2016 | Dong et al. | |
| 9,508,440 B2 | 11/2016 | Aritome | |
| 9,570,160 B1 | 2/2017 | Shah et al. | |
| 9,715,939 B2 | 7/2017 | Ellis et al. | |
| 9,792,999 B2* | 10/2017 | Lee | G11C 29/028 |
| 9,812,462 B1 | 11/2017 | Pang et al. | |
| 10,430,328 B2 | 10/2019 | Sela et al. | |
| 10,431,313 B2 | 10/2019 | Zhang et al. | |
| 10,665,301 B1 | 5/2020 | Lu et al. | |
| 10,698,610 B2 | 6/2020 | Yang | |
| 10,706,939 B2* | 7/2020 | Kim | G11C 8/08 |
| 10,892,025 B2* | 1/2021 | Banerjee | G06F 13/1668 |
| 11,188,244 B2 | 11/2021 | Sato | |
| 11,557,346 B2* | 1/2023 | Li | G11C 16/0483 |
| 2010/0195387 A1* | 8/2010 | Park | G11C 16/10 |
| | | | 365/185.03 |
| 2010/0322005 A1 | 12/2010 | Dong et al. | |
| 2013/0208543 A1* | 8/2013 | Park | G11C 16/10 |
| | | | 365/185.19 |
| 2013/0250688 A1 | 9/2013 | Chen et al. | |
| 2015/0131380 A1* | 5/2015 | Chin | G11C 16/10 |
| | | | 365/185.12 |

\* cited by examiner

800

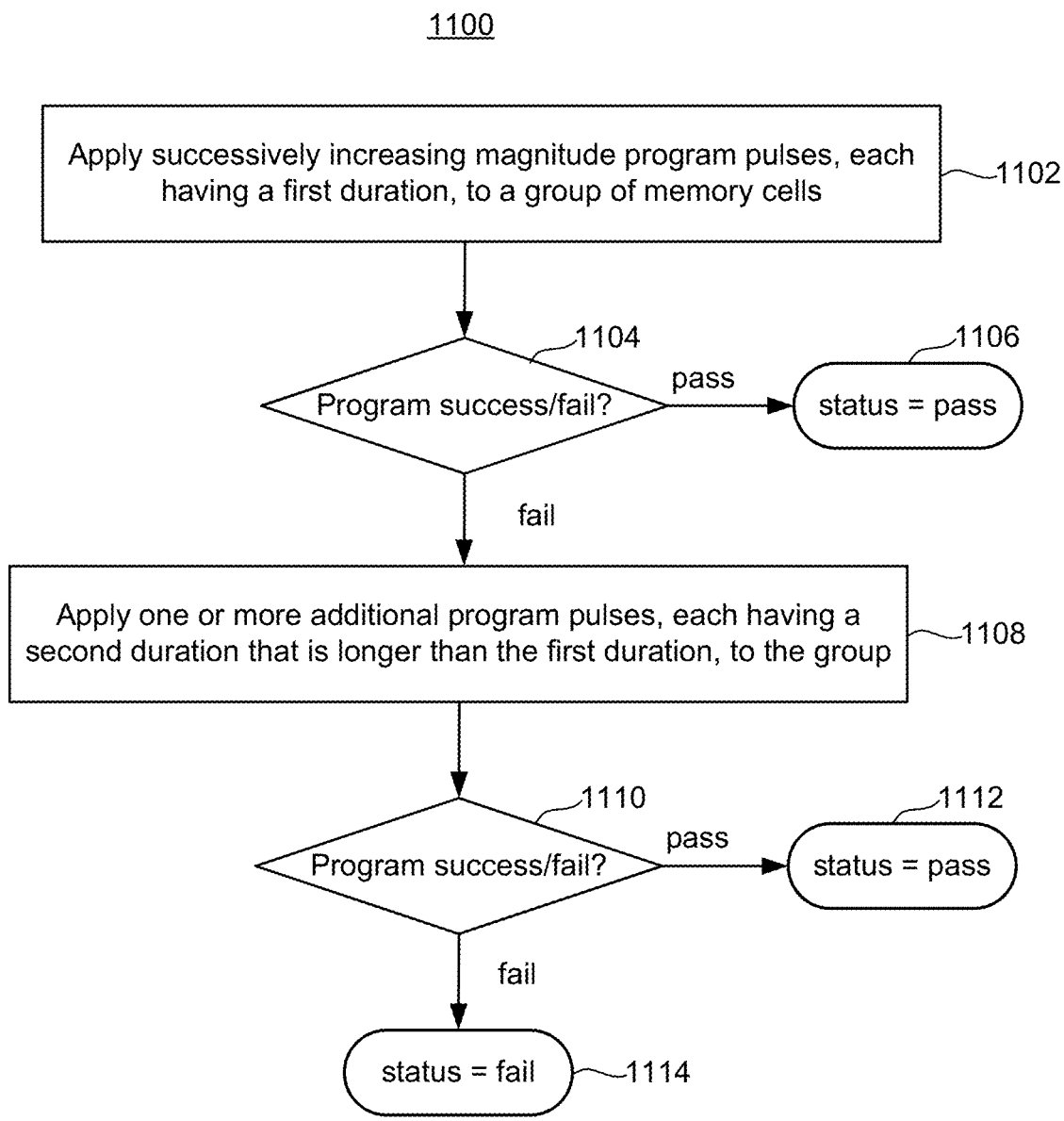

1300

| Erase Block # | EPT count | Program Pulse Duration |
|---|---|---|
| 0 | ... | Default |
| 1 | ... | Long |
| 2 | ... | Default |
| 3 | ... | Default |
| ... | ... | ... |
| M | ... | Default |

1400

PROGRAM PULSE DURATION INCREASE FOR NAND PROGRAM FAILURE

CLAIM OF PRIORITY

The present application claims priority from U.S. Provisional Patent Application No. 63/416,844, entitled "PROGRAM PULSE DURATION INCREASE FOR NAND PROGRAM FAILURE," by Zainuddin et al., filed Oct. 17, 2022, incorporated by reference herein in its entirety.

BACKGROUND

The present disclosure relates to non-volatile memory.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a source of power (e.g., a battery).

A memory structure in the memory system typically contains many memory cells and various control lines. The memory structure may be three-dimensional. One type of three-dimensional structure has non-volatile memory cells arranged as vertical NAND strings. The memory structure may be arranged into units that are commonly referred to as blocks. For example, a block in a NAND memory system contains many NAND strings. A NAND string contains memory cell transistors connected in series, a drain side select gate at one end, and a source side select gate at the other end. Each NAND string is associated with a bit line. The block typically has many word lines that provide voltages to the control gates of the memory cell transistors. In some architectures, each word line connects to the control gate of one memory cell on each NAND string in the block.

The non-volatile memory cells may be programmed to store data. Typically, the memory cells are programmed to a number of data states. Using two data states to store a single bit per cell is referred to herein as SLC programming. Using a greater number of data states allows for more bits to be stored per memory cell. Using additional data states to store two or more bits per cell is referred to herein as MLC programming. For example, four data states may be used to store two bits per memory cell, eight data states may be used in order to store three bits per memory cell, 16 data states may be used to store four bits per memory cell, etc. Some memory cells may be programmed to a data state by storing charge in the memory cell. For example, the threshold voltage (Vt) of a NAND memory cell can be set to a target Vt by programming charge into a charge storage region such as a charge trapping layer. The amount of charge stored in the charge trapping layer establishes the Vt of the memory cell.

Prior to programming NAND memory cells the memory cells are erased. Erasing the memory cells will typically lower the Vt of each memory cell that is not already below an erase verify reference voltage. Typically, many memory cells are erased at the same time. The term "erase block" or "erase group" may be used herein to refer to a group of NAND memory cells that share word lines and are erased together. However, note that not all of the memory cells that share the same word lines are necessarily in the erase group.

During a program operation a series of program voltage pulses are applied to the control gates of the memory cells. Each voltage pulse may be stepped up in magnitude from a previous program pulse by a step size in a process referred to as incremental step pulse programming. Each program voltage may be followed by a verify operation to determine if the respective memory cells have been programmed to the desired memory state. Thus, the program operation may include a number of program/verify loops. The word line that is connected to the memory cells being programmed is referred to herein as the "selected word line." The remaining word lines connected to other memory cells on the NAND strings are referred to herein as "unselected word lines."

The program operation may have a maximum allowed magnitude for the program voltage, which may be reached after a pre-determined number of program loops. The program operation may fail to successfully program data into the memory cells. In some cases, the program operation may fail despite reaching a maximum allowed program voltage. In other cases, the program operation may be terminated prior to reaching a maximum allowed program voltage. Herein, the phrase "early program termination" is used to refer to a termination in the program operation prior to reaching the maximum allowed program voltage even though the data has not yet successfully been programmed into the memory cells. Early program termination is one type of program failure.

BRIEF DESCRIPTION OF THE DRAWINGS

Like-numbered elements refer to common components in the different figures.

FIG. 11 is a flowchart of one embodiment of a process that may include applying one or more additional pulses having an increased duration to a group of memory cells to complete their programming.

DETAILED DESCRIPTION

Technology is disclosed herein in which a duration of a program pulse used to program non-volatile memory cells such as NAND may be increased responsive to a programming failure using a shorter duration program pulse. In an embodiment, the duration of at least one program pulse is increased for at least one group of memory cells in response to a failure to program a group using a default program pulse duration. The group that experiences the increased duration program pulse may be the same group for which the program operation failed using the shorter program pulse or may be a different group than the group for which the program operation failed using the shorter program pulse.

In one embodiment, the duration of the program pulse for a group of memory cells is increased in response to a failure to program that group using a default program pulse duration despite the program pulse reaching a maximum allowed magnitude after a number of successive increases in the magnitude of the program pulse with the default duration. That group may be programmed with one or more additional program pulses having the maximum allowed magnitude, but with a longer duration program pulse than the default program pulse duration.

In one embodiment, the duration of the program pulse for memory cells in an erase block is increased in response to a failure to program one or more groups of cells in that erase block using a default program pulse duration if the program operation fails prior to reaching the maximum allowed magnitude. For example, the duration of the program pulse for memory cells in an erase block may be increased in response to early program termination of a group of cells in that erase block using a default program pulse duration. These other groups in the erase block may be programmed using a number of program pulses having the increased duration in which the program pulses successively increase in magnitude. Additionally, the group that had the early program termination could be programmed using the increased duration program pulse. For example, the group that had the early program termination could be programmed in the future (e.g., after erase) using the increased duration program pulse.

The reasons for the program failure can vary. One possible reason is for some of the memory cells to be slow to program. Memory cells could program at different speeds due to factors such as variations in the physical characteristics of cells due to limitations in the fabrication process. In an embodiment, the longer duration program pulses are able to successfully program such slow to program cells.

Figure 1:
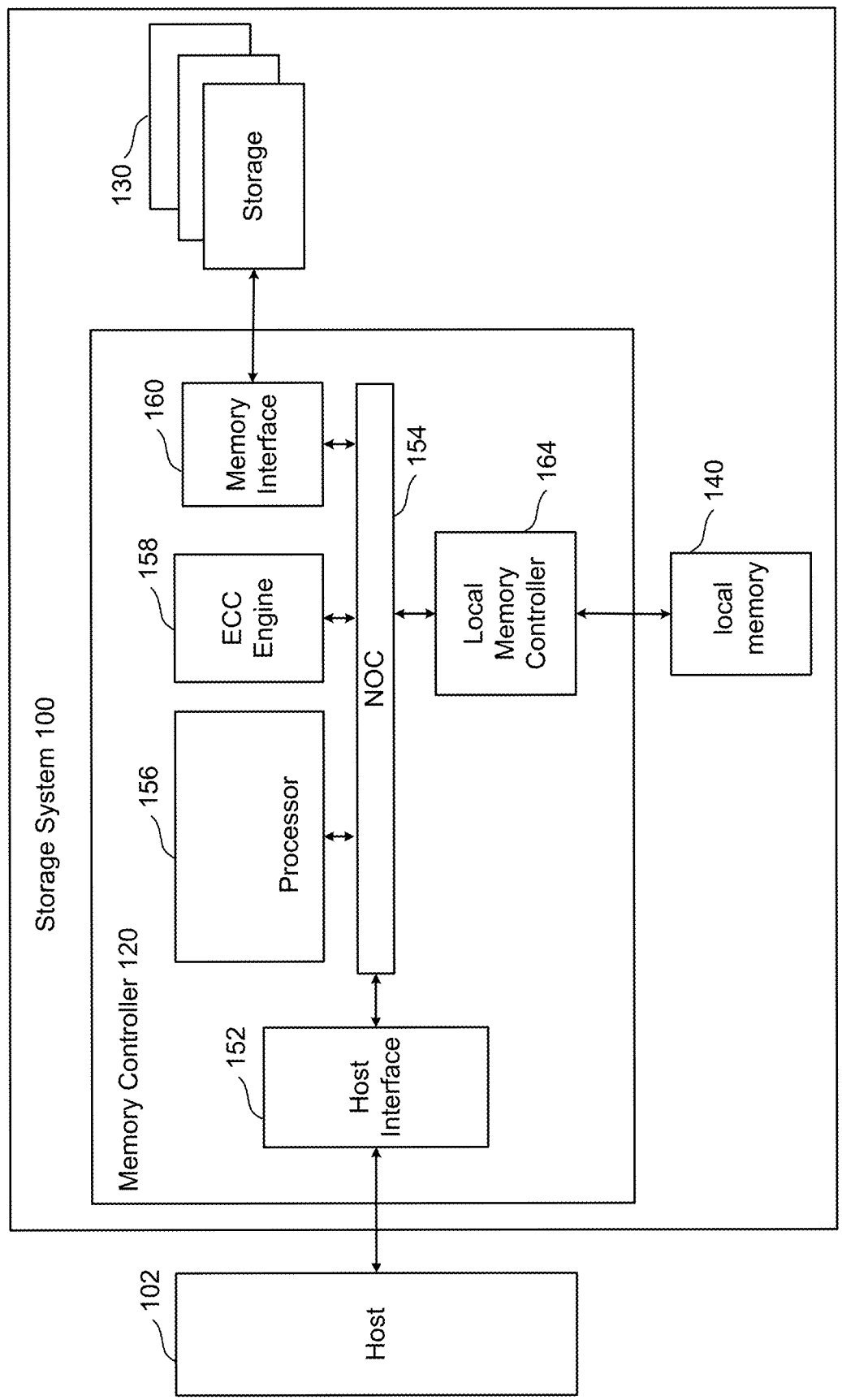
FIG. 1 is a block diagram depicting one embodiment of a storage system.

FIG. 1 is a block diagram of one embodiment of a storage system 100 that implements the technology described herein. In one embodiment, storage system 100 is a solid state drive ("SSD"). Storage system 100 can also be a memory card, USB drive or other type of storage system. The proposed technology is not limited to any one type of storage system. Storage system 100 is connected to host 102, which can be a computer, server, electronic device (e.g., smart phone, tablet or other mobile device), appliance, or another apparatus that uses memory and has data processing capabilities. In some embodiments, host 102 is separate from, but connected to, storage system 100. In other embodiments, storage system 100 is embedded within host 102.

The components of storage system 100 depicted in FIG. 1 are electrical circuits. Storage system 100 includes a memory controller 120 (or storage controller) connected to non-volatile storage 130 and local high speed memory 140 (e.g., DRAM, SRAM, MRAM). Local memory 140 is non-transitory memory, which may include volatile memory or non-volatile memory. Local high speed memory 140 is used by memory controller 120 to perform certain operations. For example, local high speed memory 140 may store logical to physical address translation tables ("L2P tables").

Memory controller 120 comprises a host interface 152 that is connected to and in communication with host 102. In one embodiment, host interface 152 implements an NVM Express (NVMe) over PCI Express (PCIe). Other interfaces can also be used, such as SCSI, SATA, etc. Host interface 152 is also connected to a network-on-chip (NOC) 154. A NOC is a communication subsystem on an integrated circuit. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of systems on a chip (SoC) and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, NOC 154 can be replaced by a bus. Connected to and in communication with NOC 154 is processor 156, ECC engine 158, memory interface 160, and local memory controller 164. Local memory controller 164 is used to operate and communicate with local high speed memory 140 (e.g., DRAM, SRAM, MRAM).

ECC engine 158 performs error correction services. For example, ECC engine 158 performs data encoding and decoding. In one embodiment, ECC engine 158 is an electrical circuit programmed by software. For example, ECC engine 158 can be a processor that can be programmed. In other embodiments, ECC engine 158 is a custom and dedicated hardware circuit without any software. In another embodiment, the function of ECC engine 158 is implemented by processor 156.

Processor 156 performs the various controller memory operations, such as programming, erasing, reading, and memory management processes. In one embodiment, processor 156 is programmed by firmware. In other embodiments, processor 156 is a custom and dedicated hardware circuit without any software. Processor 156 also implements a translation module, as a software/firmware process or as a dedicated hardware circuit. In many systems, the non-volatile memory is addressed internally to the storage system using physical addresses associated with the one or more memory die. However, the host system will use logical addresses to address the various memory locations. This enables the host to assign data to consecutive logical addresses, while the storage system is free to store the data as it wishes among the locations of the one or more memory die. To implement this system, memory controller 120 (e.g., the translation module) performs address translation between the logical addresses used by the host and the physical addresses used by the memory die. One example implementation is to maintain tables (i.e. the L2P tables mentioned above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the local memory 140 cannot hold all of the L2P tables. In such a case, the entire set of L2P tables are stored in a storage 130 and a subset of the L2P tables are cached (L2P cache) in the local high speed memory 140.

Memory interface 160 communicates with non-volatile storage 130. In one embodiment, memory interface provides a Toggle Mode interface. Other interfaces can also be used. In some example implementations, memory interface 160 (or another portion of controller 120) implements a scheduler and buffer for transmitting data to and receiving data from one or more memory die.

Figure 2A:
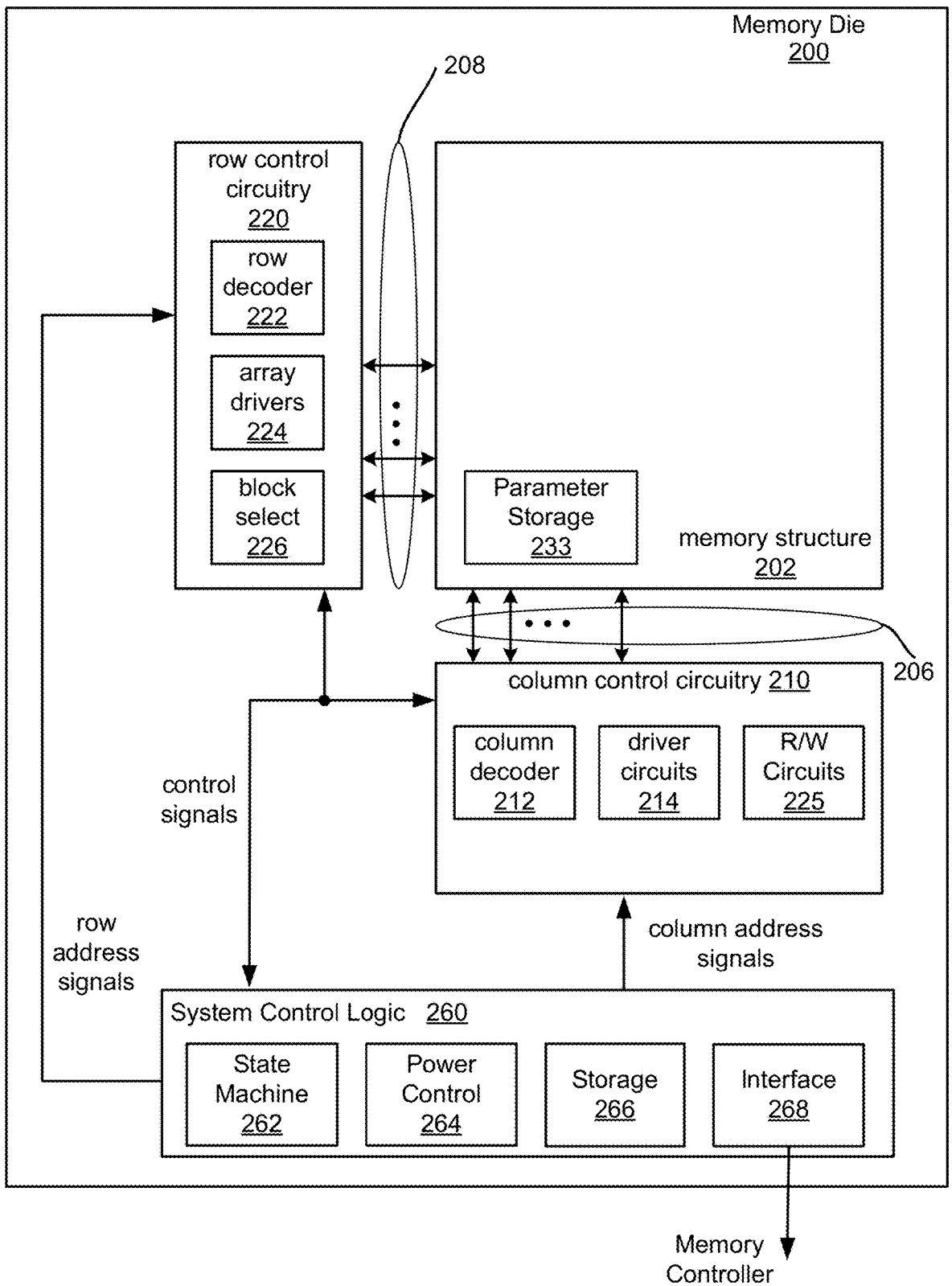
FIG. 2A is a block diagram of one embodiment of a memory die.

In one embodiment, non-volatile storage 130 comprises one or more memory dies. FIG. 2A is a functional block diagram of one embodiment of a memory die 200 that comprises non-volatile storage 130. Each of the one or more memory dies of non-volatile storage 130 can be implemented as memory die 200 of FIG. 2A. The components depicted in FIG. 2A are electrical circuits. Memory die 200 includes a memory structure 202 (e.g., memory array) that can comprise non-volatile memory cells (also referred to as non-volatile storage cells), as described in more detail below. The array terminal lines of memory structure 202 include the various layer(s) of word lines organized as rows, and the various layer(s) of bit lines organized as columns. However, other orientations can also be implemented. Memory die 200 includes row control circuitry 220, whose outputs are connected to respective word lines of the memory structure 202. Row control circuitry 220 receives a group of M row address signals and one or more various control signals from System Control Logic circuit 260, and typically may include such circuits as row decoders 222, array drivers 224, and block select circuitry 226 for both reading and writing (programming) operations. Row control circuitry 220 may also include read/write circuitry. Memory die 200 also includes column control circuitry 210 including read/write circuits 225. The read/write circuits 225 may contain sense amplifiers and data latches. The sense amplifier(s) input/outputs are connected to respective bit lines of the memory structure 202. Although only single block is shown for structure 202, a memory die can include multiple arrays that can be individually accessed. Column control circuitry 210 receives a group of N column address signals and one or more various control signals from System Control Logic 260, and typically may include such circuits as column decoders 212, array terminal receivers or driver circuits 214, as well as read/write circuitry 225, and I/O multiplexers.

System control logic 260 receives data and commands from memory controller 120 and provides output data and status to the host. In some embodiments, the system control logic 260 (which comprises one or more electrical circuits) includes state machine 262 that provides die-level control of memory operations. In one embodiment, the state machine 262 is programmable by software. In other embodiments, the state machine 262 does not use software and is completely implemented in hardware (e.g., electrical circuits). In another embodiment, the state machine 262 is replaced by a micro-controller or microprocessor, either on or off the memory chip. System control logic 260 can also include a power control module 264 that controls the power and voltages supplied to the rows and columns of the memory structure 202 during memory operations. System control logic 260 includes storage 266 (e.g., RAM, registers, latches, etc.), which may be used to store parameters for operating the memory structure 202. Such parameters may include timing parameters for program operations as disclosed herein. These parameters are sometimes referred to as "trim parameters." In one embodiment, the trim parameters include a parameter for the time duration of a program pulse. In an embodiment, some of the memory cells in the memory structure 202 are used for parameter storage 233. These parameters may be transferred to storage 266 when the memory die 200 is powered on.

Commands and data are transferred between memory controller 120 and memory die 200 via memory controller interface 268 (also referred to as a "communication interface"). Memory controller interface 268 is an electrical interface for communicating with memory controller 120. Examples of memory controller interface 268 include a Toggle Mode Interface and an Open NAND Flash Interface (ONFI). Other I/O interfaces can also be used.

In some embodiments, all the elements of memory die 200, including the system control logic 260, can be formed as part of a single die. In other embodiments, some or all of the system control logic 260 can be formed on a different die than the die that contains the memory structure 202.

In one embodiment, memory structure 202 comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping layers.

In another embodiment, memory structure 202 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 202 is not limited to the examples above. Many different types of memory array architectures or memory technologies can be used to form memory structure 202. No particular non-volatile memory technology is required for purposes of the new claimed embodiments proposed herein. Other examples of suitable technologies for memory cells of the memory structure 202 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 202 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 2A can be grouped into two parts: (1) memory structure 202 and (2) peripheral circuitry, which includes all of the other components depicted in FIG. 2A. An important characteristic of a memory circuit is its capacity, which can be increased by increasing the area of the memory die of storage system 100 that is given over to the memory structure 202; however, this reduces the area of the memory die available for the peripheral circuitry. This can place quite severe restrictions on these elements of the peripheral circuitry. For example, the need to fit sense amplifier circuits within the available area can be a significant restriction on sense amplifier design architectures. With respect to the system control logic 260, reduced availability of area can limit the available functionalities that can be implemented on-chip. Consequently, a basic trade-off in the design of a memory die for the storage system 100 is the amount of area to devote to the memory structure 202 and the amount of area to devote to the peripheral circuitry.

Another area in which the memory structure 202 and the peripheral circuitry are often at odds is in the processing involved in forming these regions, since these regions often involve differing processing technologies and the trade-off in having differing technologies on a single die. For example, when the memory structure 202 is NAND flash, this is an NMOS structure, while the peripheral circuitry is often CMOS based. For example, elements such sense amplifier circuits, charge pumps, logic elements in a state machine, and other peripheral circuitry in system control logic 260 often employ PMOS devices. Processing operations for manufacturing a CMOS die will differ in many aspects from the processing operations optimized for an NMOS flash NAND memory or other memory cell technologies. Three-dimensional NAND structures (see, for example, FIG. 4) in particular may benefit from specialized processing operations.

To improve upon these limitations, embodiments described below can separate the elements of FIG. 2A onto separately formed dies that are then bonded together. More specifically, the memory structure 202 can be formed on one die (referred to as the memory die) and some or all of the peripheral circuitry elements, including one or more control circuits, can be formed on a separate die (referred to as the control die). For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate control die. This allows each of the memory die to be optimized individually according to its technology. For example, a NAND memory die can be optimized for an NMOS based memory array structure, without worrying about the CMOS elements that have now been moved onto a control die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other die. Although the following will focus on a bonded memory circuit of one memory die and one control die, other embodiments can use more dies, such as two memory dies and one control die, for example.

Figure 2B:
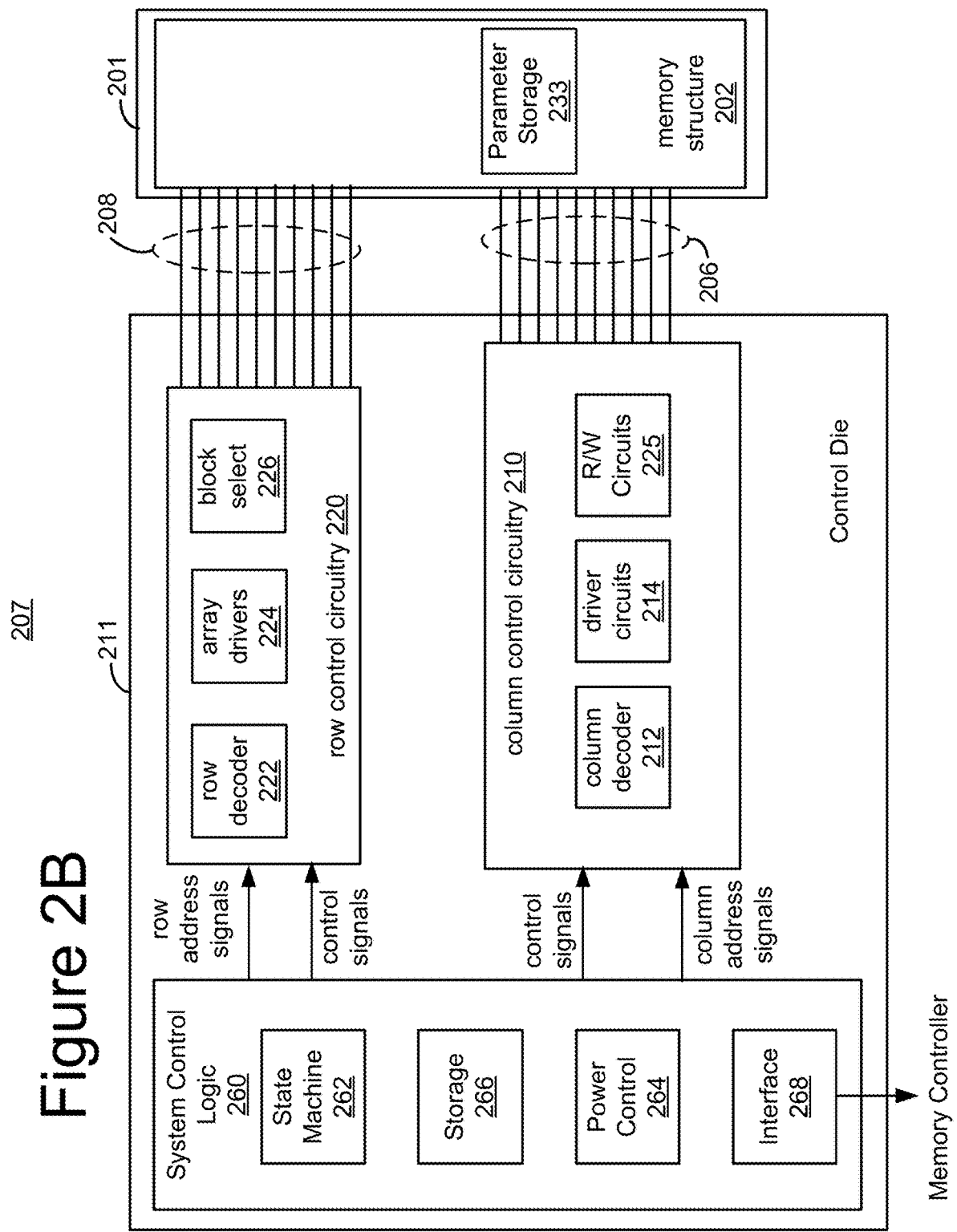
FIG. 2B is a block diagram of one embodiment of an integrated memory assembly.

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 207. One or more integrated memory assemblies 207 may be used to implement the non-volatile storage 130 of storage system 100. The integrated memory assembly 207 includes two types of semiconductor dies (or more succinctly, "die"). Memory structure die 201 includes memory structure 202. Memory structure 202 includes non-volatile memory cells. Control die 211 includes control circuitry 260, 210, and 220 (as described above). In some embodiments, control die 211 is configured to connect to the memory structure 202 in the memory structure die 201. In some embodiments, the memory structure die 201 and the control die 211 are bonded together.

FIG. 2B shows an example of the peripheral circuitry, including control circuits, formed in a peripheral circuit or control die 211 coupled to memory structure 202 formed in memory structure die 201. Common components are labelled similarly to FIG. 2A. System control logic 260, row control circuitry 220, and column control circuitry 210 are located in control die 211. In some embodiments, all or a portion of the column control circuitry 210 and all or a portion of the row control circuitry 220 are located on the memory structure die 201. In some embodiments, some of the circuitry in the system control logic 260 is located on the on the memory structure die 201.

System control logic 260, row control circuitry 220, and column control circuitry 210 may be formed by a common process (e.g., CMOS process), so that adding elements and functionalities, such as ECC, more typically found on a memory controller 120 may require few or no additional process steps (i.e., the same process steps used to fabricate controller 120 may also be used to fabricate system control logic 260, row control circuitry 220, and column control circuitry 210). Thus, while moving such circuits from a die such as memory structure die 201 may reduce the number of steps needed to fabricate such a die, adding such circuits to a die such as control die 211 may not require many additional process steps. The control die 211 could also be referred to as a CMOS die, due to the use of CMOS technology to implement some or all of control circuitry 260, 210, 220.

FIG. 2B shows column control circuitry 210 including read/write circuits 225 on the control die 211 coupled to memory structure 202 on the memory structure die 201 through electrical paths 206. For example, electrical paths 206 may provide electrical connection between column decoder 212, driver circuitry 214, and R/W circuits 225 and bit lines of memory structure 202. Electrical paths may extend from column control circuitry 210 in control die 211 through pads on control die 211 that are bonded to corresponding pads of the memory structure die 201, which are connected to bit lines of memory structure 202. Each bit line of memory structure 202 may have a corresponding electrical path in electrical paths 206, including a pair of bond pads, which connects to column control circuitry 210. Similarly, row control circuitry 220, including row decoder 222, array drivers 224, and block select 226 are coupled to memory structure 202 through electrical paths 208. Each electrical path 208 may correspond to a word line, dummy word line, or select gate line. Additional electrical paths may also be provided between control die 211 and memory structure die 201.

For purposes of this document, the phrases "a control circuit" or "one or more control circuits" can include any one of or any combination of memory controller 120, state machine 262, power control 264, all or a portion of system control logic 260, all or a portion of row control circuitry 220, all or a portion of column control circuitry 210, read/write circuits 225, sense amps, a microcontroller, a microprocessor, and/or other similar functioned circuits. A control circuit can include hardware only or a combination of hardware and software (including firmware). For example, a controller programmed by firmware to perform the functions described herein is one example of a control circuit. A control circuit can include a processor, Field Programmable Gate Array (FPGA), Application Specific Integrated Circuit (ASIC), integrated circuit, or other type of circuit.

For purposes of this document, the term "apparatus" can include, but is not limited to, one or more of, storage system 100, memory controller 120, storage 130, memory die 200, integrated memory assembly 207, and/or control die 211.

Figure 3A:
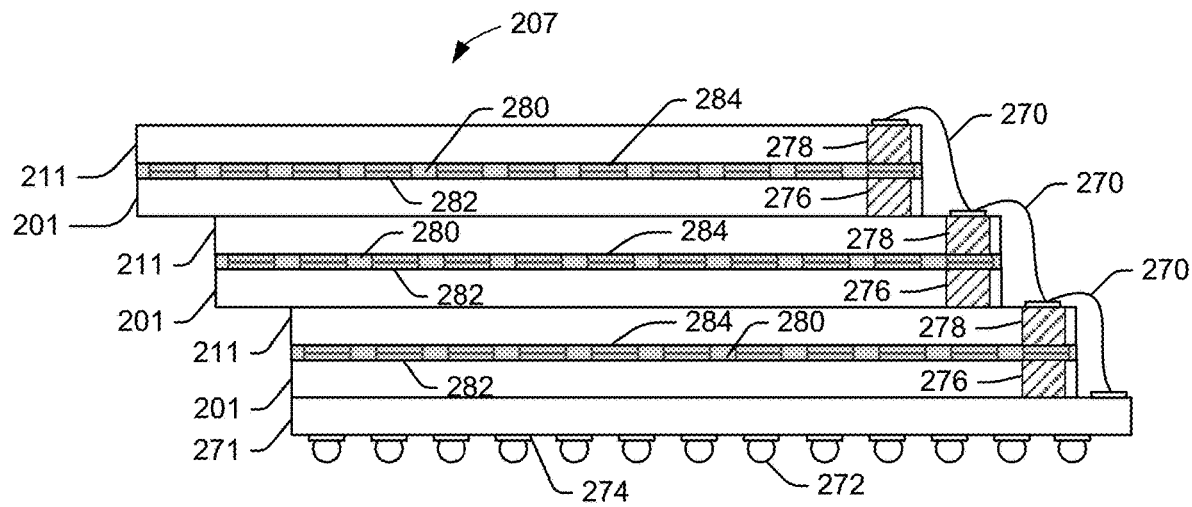
FIGS. 3A and 3B depict different embodiments of integrated memory assemblies.

In some embodiments, there is more than one control die 211 and more than one memory structure die 201 in an integrated memory assembly 207. In some embodiments, the integrated memory assembly 207 includes a stack of multiple control dies 211 and multiple memory structure dies 201. FIG. 3A depicts a side view of an embodiment of an integrated memory assembly 207 stacked on a substrate 271 (e.g., a stack comprising control die 211 and memory structure die). The integrated memory assembly 207 has three control dies 211 and three memory structure dies 201. In some embodiments, there are more than three memory structure dies 201 and more than three control dies 211. In FIG. 3A there are an equal number of memory structure dies 201 and control dies 211; however, in one embodiment, there are more memory structure dies 201 than control dies 211. For example, one control die 211 could control multiple memory structure dies 201.

Each control die 211 is affixed (e.g., bonded) to at least one of the memory structure die 201. Some of the bond pads 282/284 are depicted. There may be many more bond pads. A space between two die 201, 211 that are bonded together is filled with a solid layer 280, which may be formed from epoxy or other resin or polymer. This solid layer 280 protects the electrical connections between the die 201, 211, and further secures the die together. Various materials may be used as solid layer 280.

The integrated memory assembly 207 may for example be stacked with a stepped offset, leaving the bond pads at each level uncovered and accessible from above. Wire bonds 270 connected to the bond pads connect the control die 211 to the substrate 271. A number of such wire bonds may be formed across the width of each control die 211 (i.e., into the page of FIG. 3A).

A memory die through silicon via (TSV) 276 may be used to route signals through a memory structure die 201. A control die through silicon via (TSV) 278 may be used to route signals through a control die 211. The TSVs 276, 278 may be formed before, during or after formation of the integrated circuits in the semiconductor dies 201, 211. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package. The solder balls 272 may form a part of the interface between integrated memory assembly 207 and memory controller 120.

Figure 3B:
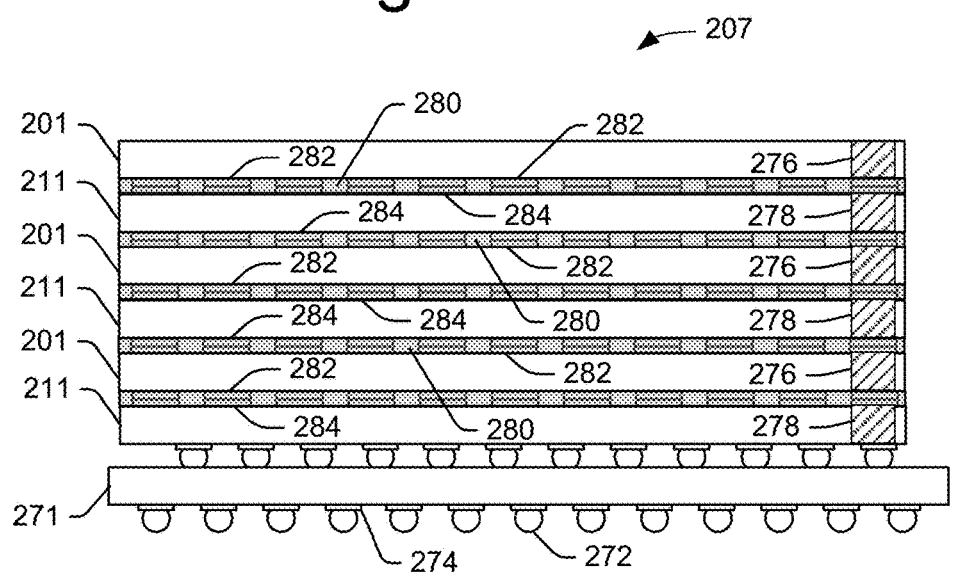

FIG. 3B depicts a side view of another embodiment of an integrated memory assembly 207 stacked on a substrate 271. The integrated memory assembly 207 of FIG. 3B has three control dies 211 and three memory structure dies 201. In some embodiments, there are many more than three memory structure dies 201 and many more than three control dies 211. In this example, each control die 211 is bonded to at least one memory structure die 201. Optionally, a control die 211 may be bonded to two or more memory structure dies 201.

Some of the bond pads 282, 284 are depicted. There may be many more bond pads. A space between two dies 201, 211 that are bonded together is filled with a solid layer 280, which may be formed from epoxy or other resin or polymer. In contrast to the example in FIG. 3A, the integrated memory assembly 207 in FIG. 3B does not have a stepped offset. A memory die through silicon via (TSV) 276 may be used to route signals through a memory structure die 201. A control die through silicon via (TSV) 278 may be used to route signals through a control die 211.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package.

As has been briefly discussed above, the control die 211 and the memory structure die 201 may be bonded together. Bond pads on each die 201, 211 may be used to bond the two die together. In some embodiments, the bond pads are bonded directly to each other, without solder or other added material, in a so-called Cu-to-Cu bonding process. In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension. Such bonds may be formed at room temperature, though heat may also be applied. In embodiments using Cu-to-Cu bonding, the bond pads may be about 5 µm square and spaced from each other with a pitch of 5 µm to 5 µm. While this process is referred to herein as Cu-to-Cu bonding, this term may also apply even where the bond pads are formed of materials other than Cu.

When the area of bond pads is small, it may be difficult to bond the semiconductor die together. The size of, and pitch between, bond pads may be further reduced by providing a film layer on the surfaces of the semiconductor die including the bond pads. The film layer is provided around the bond pads. When the die are brought together, the bond pads may bond to each other, and the film layers on the respective die may bond to each other. Such a bonding technique may be referred to as hybrid bonding. In embodiments using hybrid bonding, the bond pads may be about 5 µm square and spaced from each other with a pitch of 1 µm to 5 µm. Bonding techniques may be used providing bond pads with even smaller sizes and pitches.

Some embodiments may include a film on surface of the dies 201, 211. Where no such film is initially provided, a space between the die may be under filled with an epoxy or other resin or polymer. The under-fill material may be applied as a liquid which then hardens into a solid layer. This under-fill step protects the electrical connections between the dies 201, 211, and further secures the die together. Various materials may be used as under-fill material.

Figure 4:
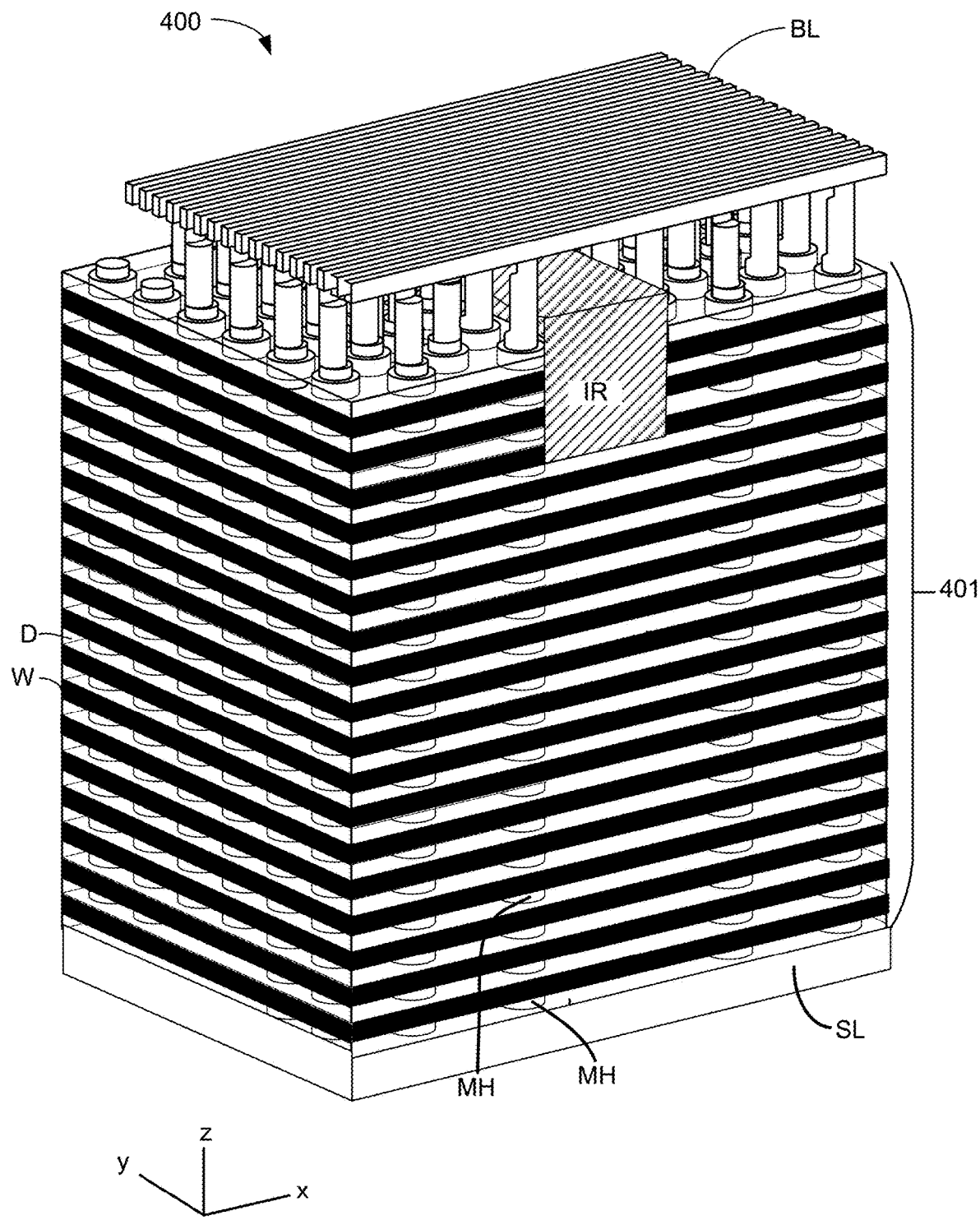
FIG. 4 is a perspective view of a portion of one example embodiment of a monolithic three dimensional memory structure.

FIG. 4 is a perspective view of a portion of one example embodiment of a monolithic three dimensional memory array/structure that can comprise memory structure 202, which includes a plurality non-volatile memory cells arranged as vertical NAND strings. For example, FIG. 4 shows a portion 400 of one block of memory. The structure depicted includes a set of bit lines BL positioned above a stack 401 of alternating dielectric layers and conductive layers. For example purposes, one of the dielectric layers is marked as D and one of the conductive layers (also called word line layers) is marked as W. The number of alternating dielectric layers and conductive layers can vary based on specific implementation requirements. In one embodiment the alternating dielectric layers and conductive layers are divided into four (or a different number of) regions (e.g., sub-blocks) by isolation regions IR. FIG. 4 shows one isolation region IR separating two sub-blocks. Below the alternating dielectric layers and word line layers is a source line layer SL. Memory holes are formed in the stack of alternating dielectric layers and conductive layers. For example, one of the memory holes is marked as MH. Note that in FIG. 4, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells. Each memory cell can store one or more bits of data. More details of the three dimensional monolithic memory array that comprises memory structure 202 is provided below.

Figure 4A:
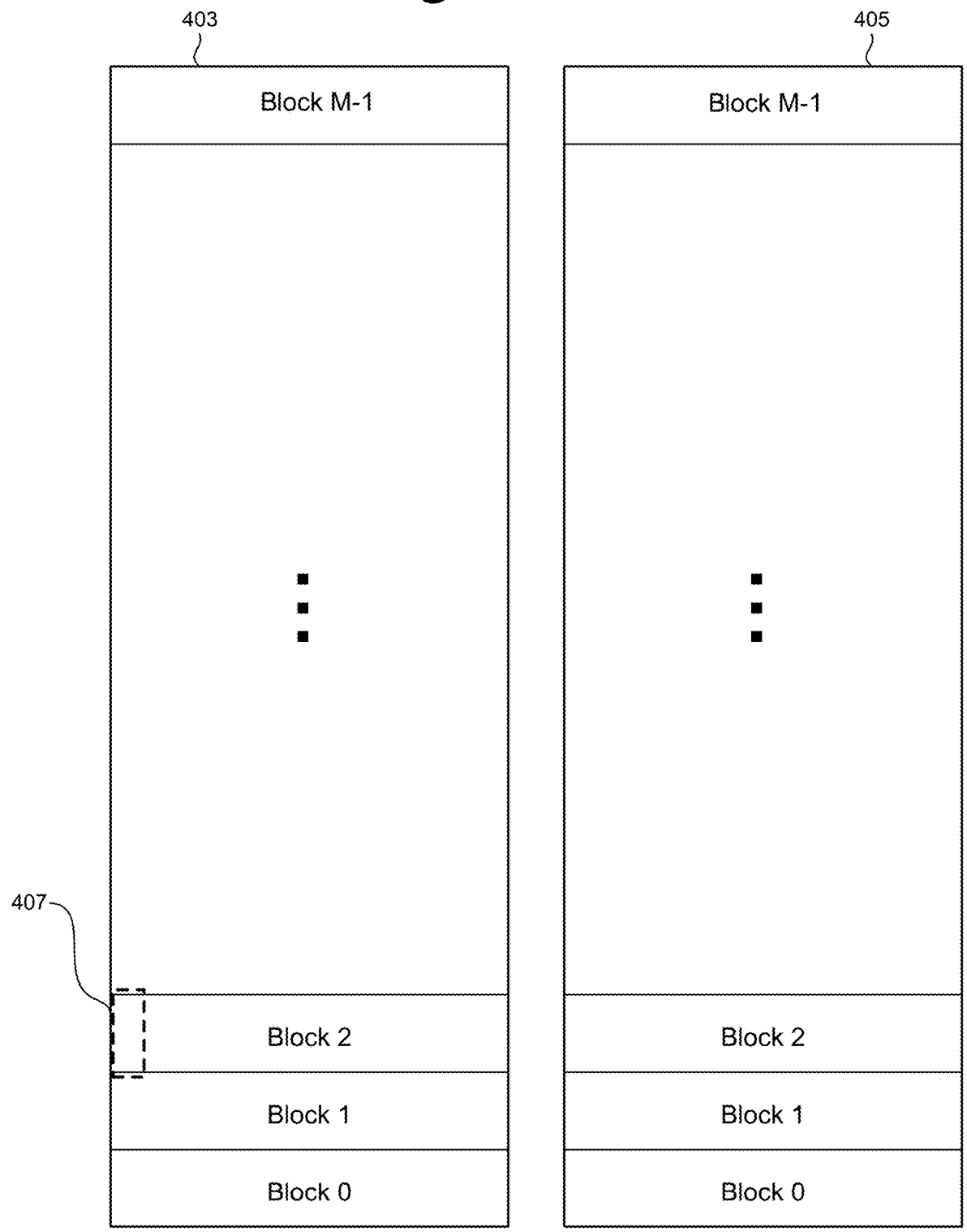
FIG. 4A is a block diagram of one embodiment of a memory structure having two planes.

FIG. 4A is a block diagram explaining one example organization of memory structure 202, which is divided into two planes 403 and 405. Each plane is then divided into M blocks. In one example, each plane has about 2000 blocks. However, different numbers of blocks and planes can also be used. In one embodiment, a block of memory cells is a unit of erase. That is, all memory cells of a block are erased together. In other embodiments, blocks can be divided into sub-blocks and the sub-blocks can be the unit of erase. Memory cells can also be grouped into blocks for other reasons, such as to organize the memory structure to enable the signaling and selection circuits. In some embodiments, a block represents a groups of connected memory cells as the memory cells of a block share a common set of word lines. For example, the word lines for a block are all connected to all of the vertical NAND strings for that block. Although FIG. 4A shows two planes 403/405, more or fewer than two planes can be implemented. In some embodiments, memory structure 202 includes four planes. In some embodiments, memory structure 202 includes eight planes. In some embodiments, programming can be performed in parallel in a first selected block in plane 403 and a second selected block in plane 405.

Figure 4B:
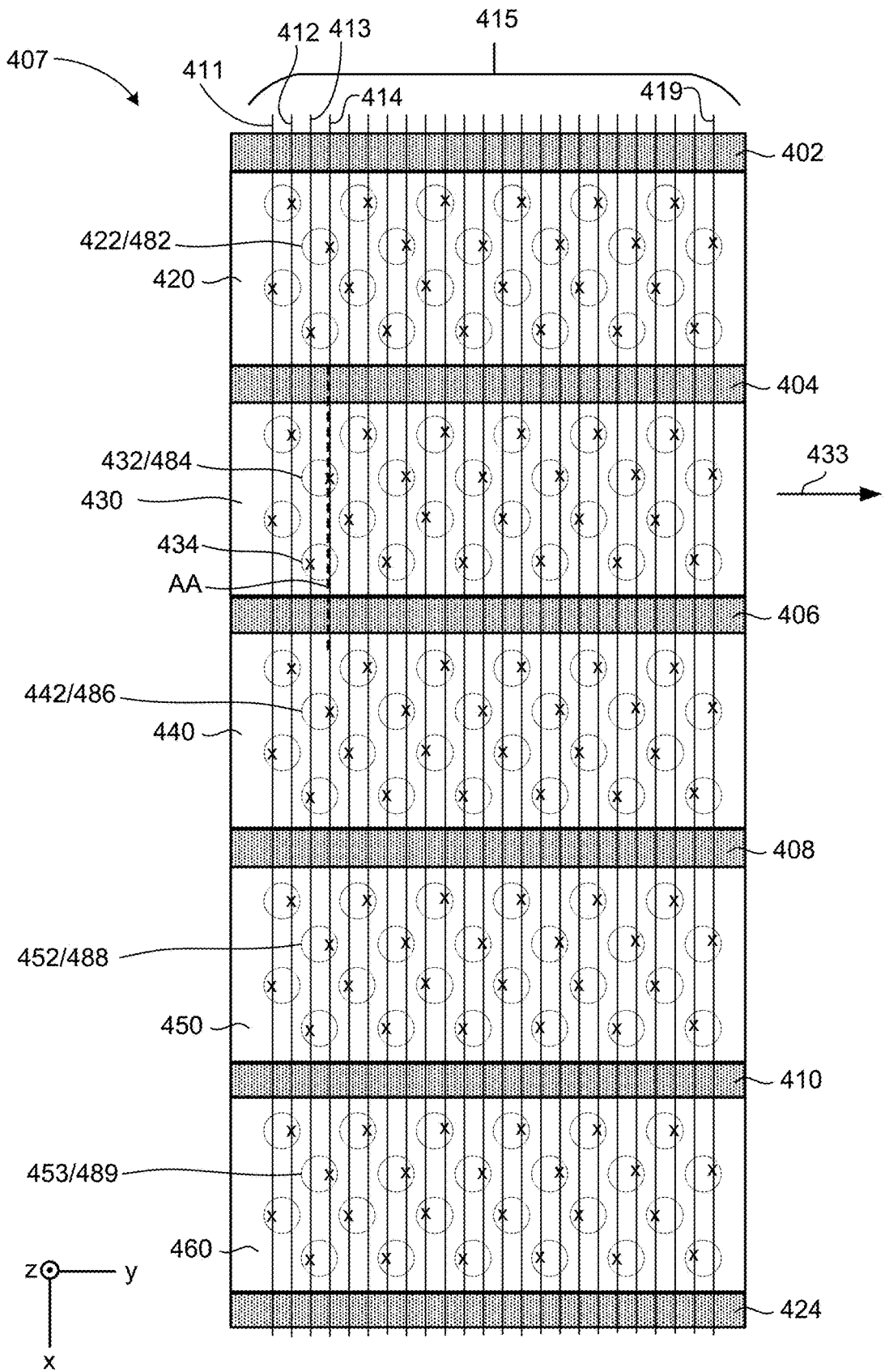
FIG. 4B is a block diagram depicting a top view of a portion of block of memory cells.

FIGS. 4B-4E depict an example three dimensional ("3D") NAND structure that corresponds to the structure of FIG. 4 and can be used to implement memory structure 202 of FIGS. 2A and 2B. FIG. 4B is a block diagram depicting a top view of a portion 407 of Block 2. As can be seen from FIG. 4B, the block depicted in FIG. 4B extends in the direction of arrow 433. In one embodiment, the memory array has many layers; however, FIG. 4B only shows the top layer.

FIG. 4B depicts a plurality of circles that represent the vertical columns. Each of the vertical columns include multiple select transistors (also referred to as a select gate or selection gate) and multiple memory cells. In one embodiment, each vertical column implements a NAND string. For example, FIG. 4B depicts vertical columns 422, 432, 442 and 452. Vertical column 422 implements NAND string 482. Vertical column 432 implements NAND string 484. Vertical column 442 implements NAND string 486. Vertical column 452 implements NAND string 488. More details of the vertical columns are provided below. Since the block depicted in FIG. 4B extends in the direction of arrow 433, the block includes more vertical columns than depicted in FIG. 4B.

FIG. 4B also depicts a set of bit lines 415, including bit lines 411, 412, 413, 414, . . . 419. FIG. 4B shows twenty-four bit lines because only a portion of the block is depicted. It is contemplated that more than twenty-four bit lines connected to vertical columns of the block. Each of the circles representing vertical columns has an "x" to indicate its connection to one bit line. For example, bit line 414 is connected to vertical columns 422, 432, 442. 452, and 453.

The block depicted in FIG. 4B includes a set of isolation regions 402, 404, 406, 408, 410, and 424, which are formed of $SiO_2$; however, other dielectric materials can also be used. Isolation regions 402, 404, 406, 408, 410, and 424 serve to divide the top layers of the block into five regions; for example, the top layer depicted in FIG. 4B is divided into regions 420, 430, 440, 450, and 460 of which are referred to as sub-blocks. In one embodiment, isolation regions 402 and 424 separate the block from adjacent blocks. Thus, isolation regions 402 and 424 may extend down to the substrate. In one embodiment, the isolation regions 404, 406, 408, and 410 only divide the layers used to implement select gates so that NAND strings in different sub-blocks can be independently selected. Referring back to FIG. 4, the IR region may correspond to any of isolation regions 404, 406, 408, and 410. In one example implementation, a bit line only connects to one vertical column/NAND string in each of regions (sub-blocks) 420, 430, 440, 450 and 460. In that implementation, each block has twenty rows of active columns and each bit line connects to five vertical columns/NAND strings in each block. In one embodiment, all of the five vertical columns/NAND strings connected to a common bit line are connected to the same word line (or set of word lines); therefore, the system uses the drain side selection lines to choose one (or another subset) of the four to be subjected to a memory operation (program, verify, read, and/or erase).

Although FIG. 4B shows each region having four rows of vertical columns, five regions and twenty rows of vertical columns in a block, those exact numbers are an example implementation. Other embodiments may include more or fewer regions per block, more or fewer rows of vertical columns per region and more or fewer rows of vertical columns per block. FIG. 4B also shows the vertical columns being staggered. In other embodiments, different patterns of staggering can be used. In some embodiments, the vertical columns are not staggered.

Figure 4C:
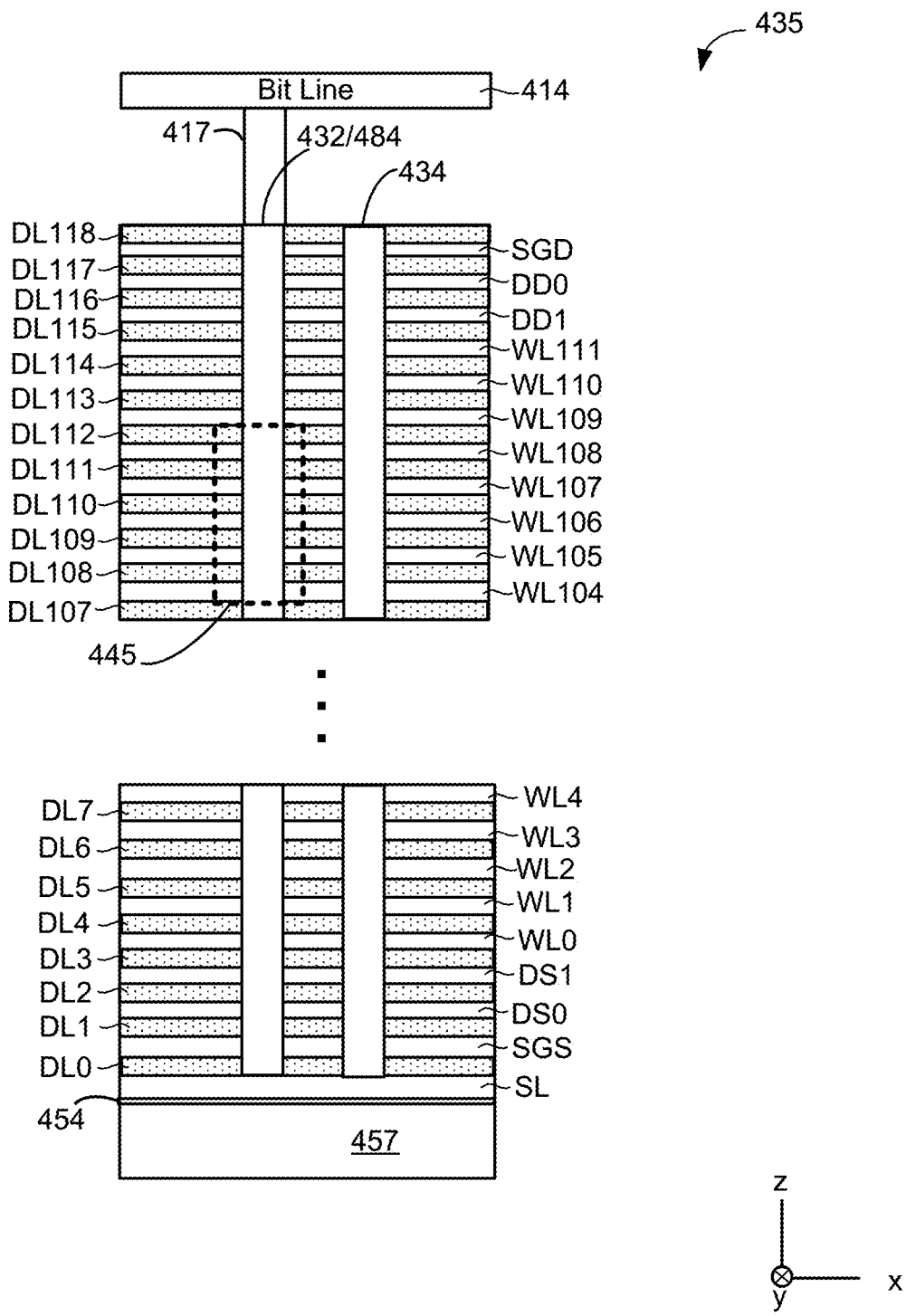
FIG. 4C depicts an embodiment of a stack showing a cross-sectional view along line AA of FIG. 4B.

FIG. 4C depicts an embodiment of a stack 435 showing a cross-sectional view along line AA of FIG. 4B. An SGD layer (SGD), an SGS layer (SGS) and four dummy word line layers DD0, DD1, DS1, and DS0 are provided, in addition to the data word line layers WL0-WL111. Each NAND string has a drain side select transistor at the SGD layer. Each NAND string has a source side select transistor at the SGS layer. There may be more than one SGD layer, as well as more than one SGS layer. Also depicted are dielectric layers DL0-DL118.

Columns 432, 434 of memory cells are depicted in the multi-layer stack. The stack includes a substrate 453, an insulating film 454 on the substrate 457, and a portion of a source line SL (or CELSRC). A portion of the bit line 414 is also depicted. Note that NAND string 484 is connected to the bit line 414. NAND string 484 has a source-end at a bottom of the stack and a drain-end at a top of the stack. The source-end is connected to the source line SL. A conductive via 417 connects the drain-end of NAND string 484 to the bit line 414.

In one embodiment, the memory cells are arranged in NAND strings. The word line layers WL0-WL111 connect to memory cells (also called data memory cells). Dummy word line layers DD0, DD1, DS0 and DS1 connect to dummy memory cells. A dummy memory cell does not store and is not eligible to store host data (data provided from the host, such as data from a user of the host), while a data memory cell is eligible to store host data. In some embodiments, data memory cells and dummy memory cells may have a same structure. Drain side select layer SGD is used to electrically connect and disconnect (or cut off) the channels of respective NAND strings from bit lines. Source side select layer SGS is used to electrically connect and disconnect (or cut off) the channels of respective NAND strings from the source line SL.

In some embodiments, the stack 435 has multiple tiers. For example, a lower tier may contain the lower half of the stack and the upper tier may contain the half of the stack. A two-tier other multi-tier stack can be used to form a relatively tall stack while maintaining a relatively narrow memory hole width (or diameter). After the layers of the lower tier are formed, memory hole portions are formed in the lower tier. Subsequently, after the layers of the upper tier are formed, memory hole portions are formed in the upper tier, aligned with the memory hole portions in the lower tier to form continuous memory holes from the bottom to the top of the stack. The resulting memory hole is narrower than would be the case if the hole were etched from the top to the bottom of the stack rather than in each tier individually. An interface (IF) region may be created where the two tiers are connected. In some embodiments, the upper tier and the lower tier are erased independent of one another. Hence, data may be maintained in the lower tier after the upper tier is erased. Likewise, data may be maintained in the upper tier after the lower tier is erased.

Figure 4D:
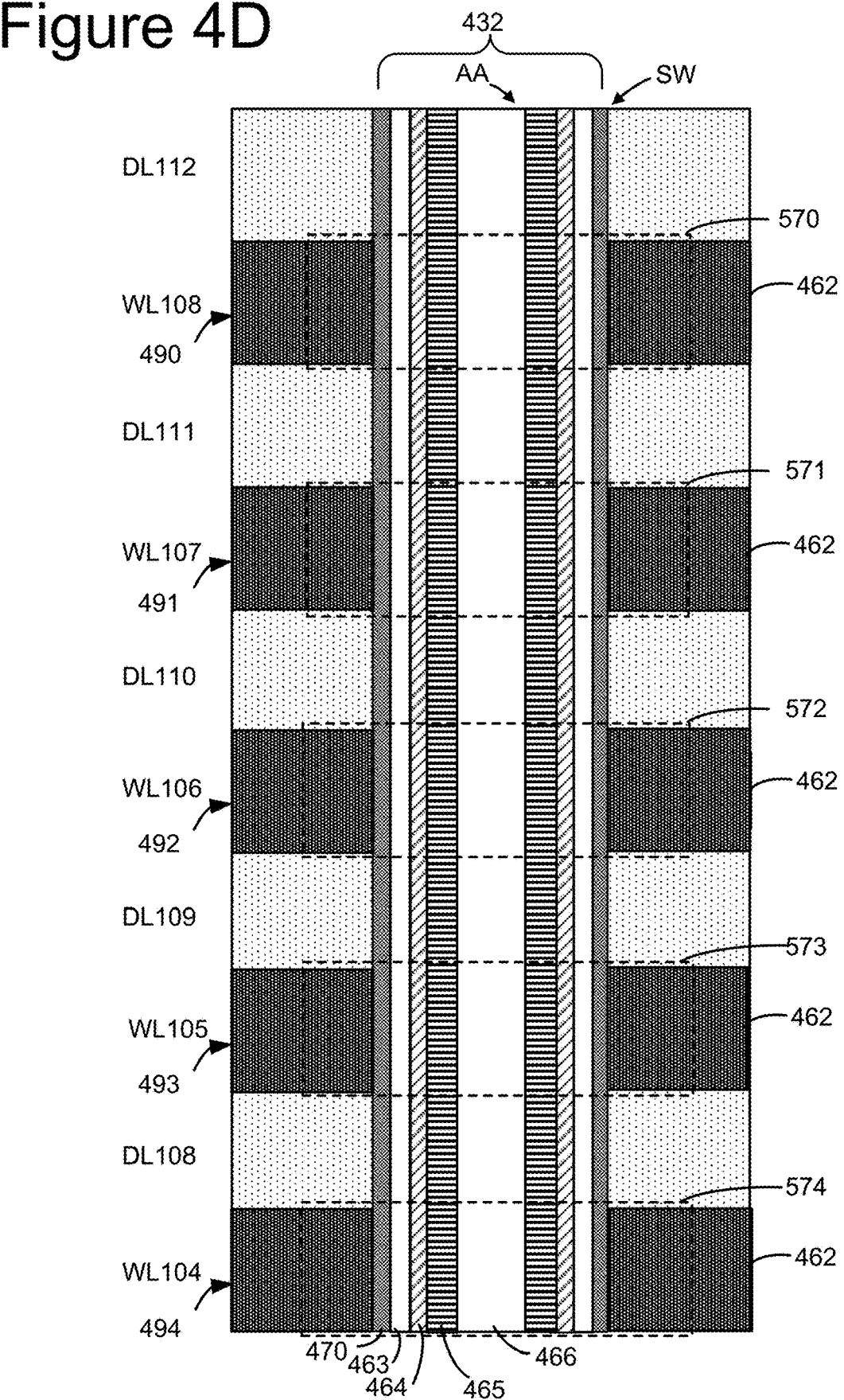
FIG. 4D depicts a view of the region 445 of FIG. 4C.

FIG. 4D depicts a view of the region 445 of FIG. 4C. Data memory cell transistors 570, 571, 572, 573, and 574 are indicated by the dashed lines. A number of layers can be deposited along the sidewall (SW) of the memory hole 432 and/or within each word line layer, e.g., using atomic layer deposition. For example, each column (e.g., the pillar which is formed by the materials within a memory hole) can include a blocking oxide/block high-k material 470, charge-trapping layer or film 463 such as SiN or other nitride, a tunneling layer 464, a polysilicon body or channel 465, and a dielectric core 466. A word line layer can include a conductive metal 462 such as Tungsten as a control gate. For example, control gates 490, 491, 492, 493 and 494 are provided. In this example, all of the layers except the metal are provided in the memory hole. In other approaches, some of the layers can be in the control gate layer. Additional pillars are similarly formed in the different memory holes. A pillar can form a columnar active area (AA) of a NAND string.

When a data memory cell transistor is programmed, electrons are stored in a portion of the charge-trapping layer which is associated with the data memory cell transistor. These electrons are drawn into the charge-trapping layer from the channel, and through the tunneling layer. The Vth of a data memory cell transistor is increased in proportion to the amount of stored charge. During an erase operation, the electrons return to the channel.

Each of the memory holes can be filled with a plurality of annular layers (also referred to as memory film layers)

comprising a blocking oxide layer, a charge trapping layer, a tunneling layer and a channel layer. A core region of each of the memory holes is filled with a body material, and the plurality of annular layers are between the core region and the WLLs in each of the memory holes. In some cases, the tunneling layer 464 can comprise multiple layers such as in an oxide-nitride-oxide configuration.

Figure 4E:
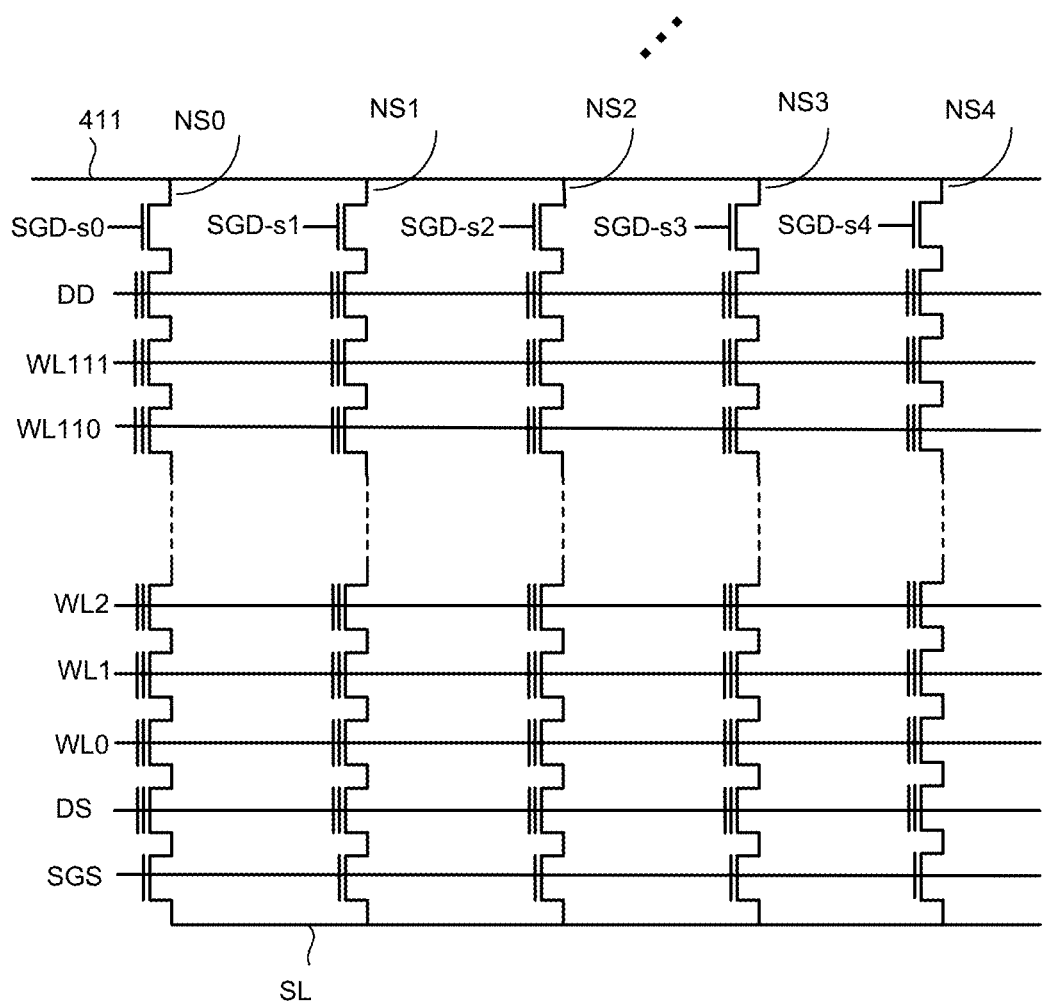
FIG. 4E is a schematic diagram of a portion of one embodiment of a block, depicting several NAND strings.

FIG. 4E is a schematic diagram of a portion of the memory depicted in in FIGS. 4-4D. FIG. 4E shows physical word lines WL0-WL111 running across the entire block. The structure of FIG. 4E corresponds to portion 407 in Block 2 of FIGS. 4A-4B, including bit lines 411, 412, 413, 414, . . . 419. Within the block, each bit line is connected to five NAND strings. Drain side selection lines SGD-s0, SGD-s1, SGD-s2, SGD-s3 and SGD-s4 are used to determine which of the five NAND strings (NS0, NS1, NS2, NS3, NS4) connect to the associated bit line. Other NAND strings of the block and other bit lines are not depicted in FIG. 4E. A first sub-block corresponds to those vertical NAND strings controlled by SGD-s0. A second sub-block corresponds to those vertical NAND strings controlled by SGD-s1. A third sub-block corresponds to those vertical NAND strings controlled by SGD-s2. A fourth sub-block corresponds to those vertical NAND strings controlled by SGD-s3. A fifth sub-block corresponds to those vertical NAND strings controlled by SGD-s4. There may be more or fewer than five sub-blocks in a block.

A source side selection line SGS connects/disconnects the NAND strings to/from the common source line. In some embodiments, there is a source side selection line for each sub-block (similar to the five SGD-s0, SGD-s1, SGD-s2, SGD-s3 and SGD-s4). The block can also be thought of as divided into five sub-blocks SB0, SB1, SB2, SB3, SB4. Sub-block SB0 corresponds to those vertical NAND strings controlled by SGD-s0, Sub-block SB1 corresponds to those vertical NAND strings controlled by SGD-s1, Sub-block SB2 corresponds to those vertical NAND strings controlled by SGD-s2, Sub-block SB3 corresponds to those vertical NAND strings controlled by SGD-s3, and Sub-block SB4 corresponds to those vertical NAND strings controlled by SGD-s4.

Although the example memories of FIGS. 4-4E are three dimensional memory structure that includes vertical NAND strings with charge-trapping material, other (2D and 3D) memory structures can also be used with the technology described herein.

Figure 5A:
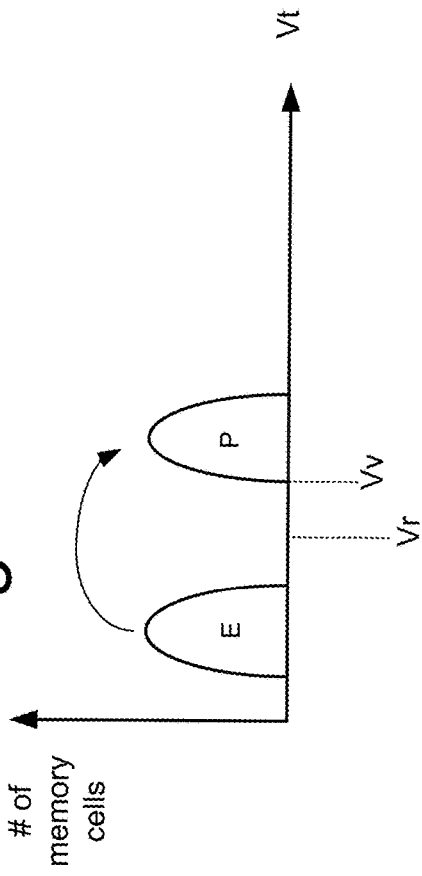
FIGS. 5A and 5B depicts threshold voltage distributions.

The storage systems discussed above can be erased, programmed and read. At the end of a successful programming process, the threshold voltages of the memory cells should be within one or more distributions of threshold voltages for programmed memory cells or within a distribution of threshold voltages for erased memory cells, as appropriate. FIG. 5A is a graph of threshold voltage versus number of memory cells, and illustrates example threshold voltage distributions for the memory array when each memory cell stores one bit of data per memory cell. Memory cells that store one bit of data per memory cell data are referred to as single level cells ("SLC"). The data stored in SLC memory cells is referred to as SLC data; therefore, SLC data comprises one bit per memory cell. Data stored as one bit per memory cell is SLC data. FIG. 5A shows two threshold voltage distributions: E and P. Threshold voltage distribution E corresponds to an erased data state. Threshold voltage distribution P corresponds to a programmed data state. Memory cells that have threshold voltages in threshold voltage distribution E are, therefore, in the erased data state (e.g., they are erased). Memory cells that have threshold voltages in threshold voltage distribution P are, therefore, in the programmed data state (e.g., they are programmed). In one embodiment, erased memory cells store data "1" and programmed memory cells store data "0." FIG. 5A depicts read reference voltage Vr. By testing (e.g., performing one or more sense operations) whether the threshold voltage of a given memory cell is above or below Vr, the system can determine a memory cells is erased (state E) or programmed (state P). FIG. 5A also depicts a verify reference voltage Vv, In some embodiments, when programming memory cells to data state P, the system will test whether those memory cells have a threshold voltage greater than or equal to Vv. In some embodiments, when programming memory cells to data state P, the system will not perform a verify operation. For example, the memory system may apply a single program pulse without verification.

Memory cells that store multiple bit per memory cell data are referred to as multi-level cells ("MLC"). The data stored in MLC memory cells is referred to as MLC data; therefore, MLC data comprises multiple bits per memory cell. Data stored as multiple bits of data per memory cell is MLC data. In the example embodiment of FIG. 5B, each memory cell stores three bits of data. Other embodiments may use other data capacities per memory cell (e.g., such as two, four, or five bits of data per memory cell).

Figure 5B:
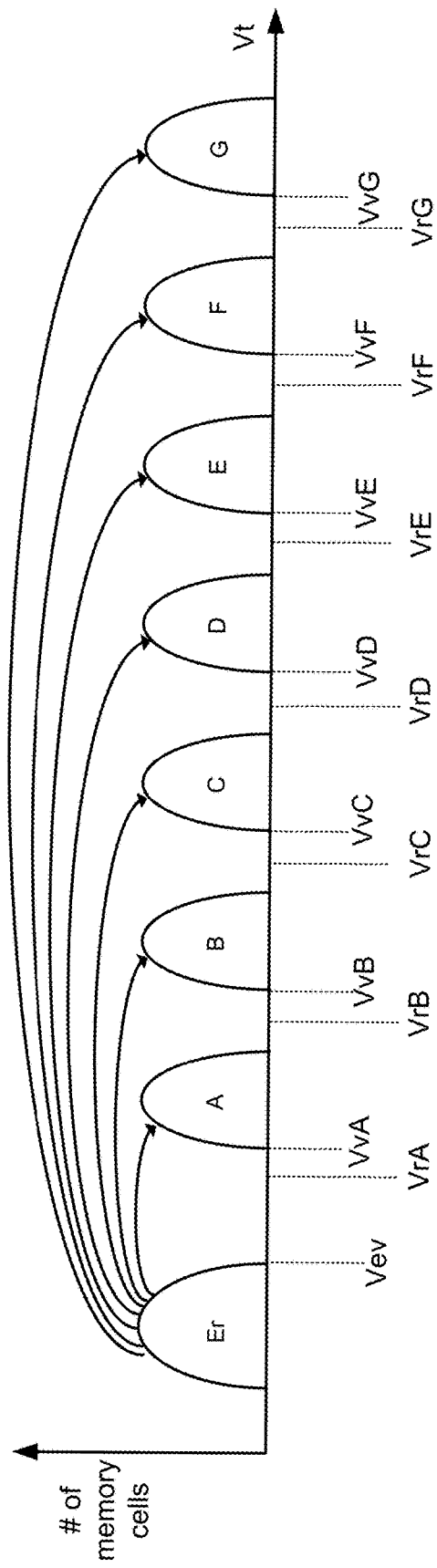

FIG. 5B shows eight threshold voltage distributions, corresponding to eight data states. The first threshold voltage distribution (data state) Er represents memory cells that are erased. The other seven threshold voltage distributions (data states) A-G represent memory cells that are programmed and, therefore, are also called programmed states. Each threshold voltage distribution (data state) corresponds to predetermined values for the set of data bits. The specific relationship between the data programmed into the memory cell and the threshold voltage levels of the cell depends upon the data encoding scheme adopted for the cells. In one embodiment, data values are assigned to the threshold voltage ranges using a Gray code assignment so that if the threshold voltage of a memory erroneously shifts to its neighboring physical state, only one bit will be affected. In an embodiment, the number of memory cells in each state is about the same.

FIG. 5B shows seven read reference voltages, VrA, VrB, VrC, VrD, VrE, VrF, and VrG for reading data from memory cells. By testing (e.g., performing sense operations) whether the threshold voltage of a given memory cell is above or below the seven read reference voltages, the system can determine what data state (i.e., A, B, C, D, . . . ) a memory cell is in. FIG. 5B also shows a number of verify reference voltages. The verify reference voltages are VvA, VvB, VvC, VvD, VvE, VvF, and VvG. In one embodiment, the verify reference voltages are VvA, VvB, VvC, VvD, VvE, VvF, and VvG are used when verifying memory cells. For example, when programming memory cells to data state A, the system will test whether those memory cells have a threshold voltage greater than or equal to VvA. If the memory cell has a threshold voltage greater than or equal to VvA, then the memory cell is locked out from further programming. Similar reasoning applies to the other data states.

In one embodiment, known as full sequence programming, memory cells can be programmed from the erased data state Er directly to any of the programmed data states A-G. For example, a population of memory cells to be programmed may first be erased so that all memory cells in the population are in erased data state Er. Then, a programming process is used to program memory cells directly into data states A, B, C, D, E. F and/or G. However, some memory cells will remain in the Er data state. For example, while some memory cells are being programmed from data state Er to data state A. other memory cells are being programmed from data state ER to data state B and/or from data state Er to data state C. and so on. The arrows of FIG. 5B represent the full sequence programming. The technology described herein can also be used with other types of programming in addition to full sequence programming (including, but not limited to, multiple stage/phase programming). In some embodiments, data states A-G can overlap, with memory controller 120 relying on ECC to identify the correct data being stored.

Figure 6:
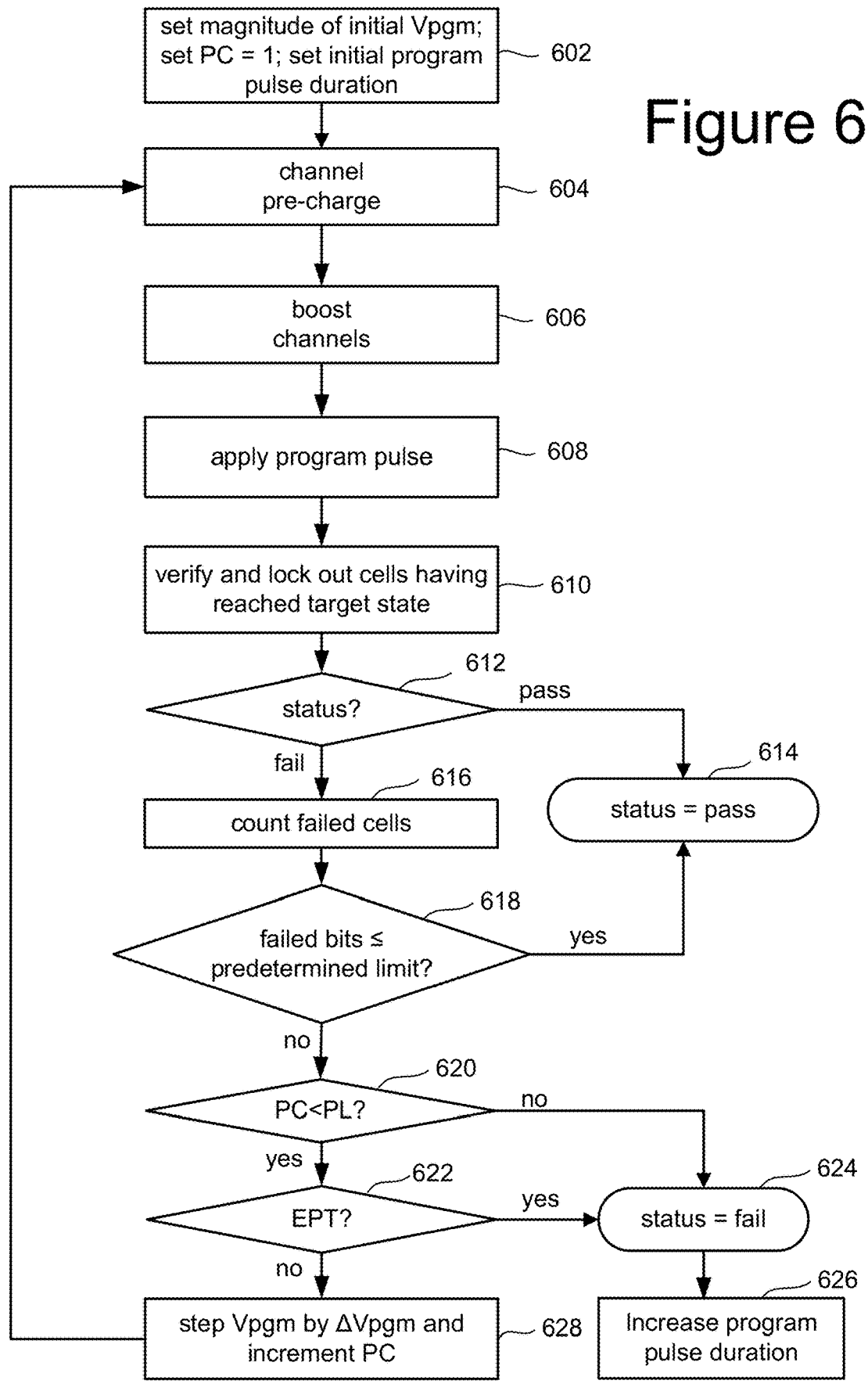
FIG. 6 is a flowchart describing one embodiment of a process for programming memory cells.

FIG. 6 is a flowchart describing one embodiment of a process for programming memory cells. For purposes of this document, the term program and programming are synonymous with write and writing. In one example embodiment, the process of FIG. 6 is performed for memory structure 202 using the one or more control circuits (e.g., system control logic 260, column control circuitry 210, row control circuitry 220) discussed above. In one example embodiment, the process of FIG. 6 is performed by integrated memory assembly 207 using the one or more control circuits (e.g., system control logic 260, column control circuitry 210, row control circuitry 220) of control die 211 to program memory cells on memory structure die 201. The process includes multiple loops, each of which includes a program phase and a verify phase. The process of FIG. 6 is performed to implement the full sequence programming, as well as other programming schemes including multi-stage programming. When implementing multi-stage programming, the process of FIG. 6 is used to implement any/each stage of the multi-stage programming process. Note that the process of FIG. 6 has multiple program-verify loops, which can also be referred to as program loops.

Typically, the program voltage applied to the control gates (via a selected data word line) during a program operation is applied as a series of program pulses (e.g., voltage pulses). Between programming pulses a set of verify pulses (e.g., voltage pulses) may be used to perform verification. However, in some embodiments, the memory cells are not verified for one or more program loops. In many implementations, the magnitude of the program pulses is increased with each successive pulse by a predetermined step size. In step 602 of FIG. 6, the programming voltage signal (Vpgm) is initialized to the starting magnitude (e.g., ~12-16V or another suitable level) and a program counter PC maintained by state machine 262 is initialized at 1. Also, the program pulse duration is set. In one embodiment, the memory system has trim parameters that specify the program pulse duration on a region by region basis. For example, the trim parameters may specify the program pulse duration on a block by block basis, or some other unit of memory cells. As will be discussed in further detail below, the program pulse duration may be increased in response to a failure to successfully program a group of cells using the shorter program pulse duration. This increased duration program pulse may then be used to program the same group that failed program or some other group in, for example, the same erase block.

In one embodiment, the group of memory cells selected to be programmed (referred to herein as the selected memory cells) are programmed concurrently and are all connected to the same word line (the selected word line). There will likely be other memory cells that are not selected for programming (unselected memory cells) that are also connected to the selected word line. That is, the selected word line will also be connected to memory cells that are supposed to be inhibited from programming. For example, with reference to FIG. 4E, the selected memory cells may be in one of the sub-blocks. Additionally, as memory cells reach their intended target data state, they will be inhibited from further programming. Those NAND strings (e.g., unselected NAND strings) that include memory cells connected to the selected word line that are to be inhibited from programming have their channels boosted to inhibit programming. When a channel has a boosted voltage, the voltage differential between the channel and the word line is not large enough to cause programming. To assist in the boosting, in step 604 the control die will pre-charge channels of NAND strings that include memory cells connected to the selected word line that are to be inhibited from programming. In step 606, NAND strings that include memory cells connected to the selected word line that are to be inhibited from programming have their channels boosted to inhibit programming. Such NAND strings are referred to herein as "unselected NAND strings." In one embodiment, the unselected word lines receive one or more boosting voltages (e.g., ~7-11 volts) to perform boosting schemes. A program inhibit voltage is applied to the bit lines coupled the unselected NAND string.

In step 608, a program voltage pulse of the programming voltage signal Vpgm is applied to the selected word line (the word line selected for programming). If a memory cell on a NAND string should be programmed, then the corresponding bit line is biased at a program enable voltage. In step 608, the program pulse is concurrently applied to all memory cells connected to the selected word line so that all of the memory cells connected to the selected word line are programmed concurrently (unless they are inhibited from programming). That is, they are programmed at the same time or during overlapping times (both of which are considered concurrent). In this manner all of the memory cells connected to the selected word line will concurrently have their threshold voltage change, unless they are inhibited from programming.

In step 610, program verify is performed and memory cells that have reached their target states are locked out from further programming. Step 610 includes performing verification of programming by sensing at one or more verify reference levels. In one embodiment, the verification process is performed by testing whether the threshold voltages of the memory cells selected for programming have reached the appropriate verify reference voltage. In step 610, a memory cell may be locked out after the memory cell has been verified (by a test of the Vt) that the memory cell has reached its target state. For example, a memory cell may be locked out if it reaches a verify reference voltage.

If, in step 612, it is determined that all of the memory cells have reached their target threshold voltages (pass), the programming process is complete and successful because all selected memory cells were programmed and verified to their target states. A status of "PASS" is reported in step 614. Otherwise if, in step 612, it is determined that not all of the memory cells have reached their target threshold voltages (fail), then the programming process continues to step 616.

In step 616, the number of memory cells that have not yet reached their respective target threshold voltage distribution are counted. That is, the number of memory cells that have, so far, failed to reach their target state are counted. This counting can be done by state machine 262, memory controller 120, or another circuit. In one embodiment, there is one total count, which reflects the total number of memory cells currently being programmed that have failed the last verify step. In another embodiment, separate counts are kept for each data state.

In step 618, it is determined whether the count from step 616 is less than or equal to a predetermined limit. In one embodiment, the predetermined limit is the number of bits that can be corrected by error correction codes (ECC) during a read process for the page of memory cells. If the number of failed cells is less than or equal to the predetermined limit, than the programming process can stop and a status of "PASS" is reported in step 614. In this situation, enough memory cells programmed correctly such that the few remaining memory cells that have not been completely programmed can be corrected using ECC during the read process. In some embodiments, the predetermined limit used in step 618 is below the number of bits that can be corrected by error correction codes (ECC) during a read process to allow for future/additional errors. When programming fewer than all of the memory cells for a page, or comparing a count for only one data state (or less than all states), than the predetermined limit can be a portion (pro-rata or not pro-rata) of the number of bits that can be corrected by ECC during a read process for the page of memory cells. In some embodiments, the limit is not predetermined. Instead, it changes based on the number of errors already counted for the page, the number of program-erase cycles performed or other criteria.

If the number of failed memory cells is not less than the predetermined limit, then the programming process continues at step 620 and the program counter PC is checked against the program limit value (PL). Examples of program limit values include 12, 16, 20, 26, and 30; however, other values can be used. If the program counter PC is not less than the program limit value PL, then the program process is considered to have failed with a status of FAIL. In one embodiment, rather than reporting the fail status from the die (200, 211) to the memory controller 120, the die (200, 211) will continue to program the data using a longer duration program pulse.

If the program counter PC is less than the program limit value PL, then a determination is made in step 622 whether to terminate the program process even though the maximum allowed program voltage has not been reached, which is referred to herein as early program termination (EPT). In one embodiment, a determination is made is step 622 that even if additional program loops were to be performed that programming would still likely fail. There are a number of possible techniques to determined whether to terminate programming early. One technique is to determine whether a specific data state has failed to complete programming within an allotted number of program loops for that data state. For example, a determination may be made whether the A-state has completed programming within an allotted number of program loops that is less than the maximum number of loops tested for in step 620. However, other techniques may be used to determine whether to terminate programming early. Further details of early program termination are discussed in U.S. Pat. No. 9,570,160, titled "Non-volatile Storage System with Defect Detection and Early Programming Termination," to Shah et al., which is hereby incorporated by reference. If it is determined in step 622 to terminate the program process early (i.e., prior to the maximum number of loops being reached) then programming stops with a status of fail (step 624). The fail status may, optionally, be reported to the memory controller 120 in step 624. Note that the EPT test may be performed at a different time in the process. Also, in some embodiments, step 622 of the EPT test is not performed. Thus, in an embodiment, EPT can be enabled or disabled.

If the program status is set to fail (step 624), then step 626 is performed. In step 626 the program pulse duration is increased. In one embodiment, the increase is applied to the same group of memory cells for which programming using the initial program pulse had the status of fail. In one embodiment, the increase is applied to the same group of memory cells if the failure occurs despite the program voltage reaching a maximum allowed magnitude, which may be the case if the maximum loop count is reached in step 620. In one embodiment, the increase is applied to a different group of memory cells in the same erase group. In one embodiment, the increase is applied to the different group of memory cells in the same erase group if the failure occurs prior to the program voltage reaching the maximum allowed magnitude, which may be the case due to EPT in step 622.

If the determination in step 622 is to not terminate the program process, then the process continues at step 628 during which time the Program Counter PC is incremented by 1 and the programming voltage signal Vpgm is stepped up to the next magnitude. For example, the next pulse will have a magnitude greater than the previous pulse by a step size ΔVpgm (e.g., a step size of 0.1-1.0 volts). After step 628, the process loops back to step 604 and another program pulse is applied to the selected word line so that another iteration (steps 604-628) of the programming process of FIG. 6 is performed.

In one embodiment memory cells are erased prior to programming, and erasing is the process of changing the threshold voltage of one or more memory cells from a programmed data state to an erased data state. For example, changing the threshold voltage of one or more memory cells from state P to state E of FIG. 5A, or from states A-G to state Er of FIG. 5B.

Figure 7:
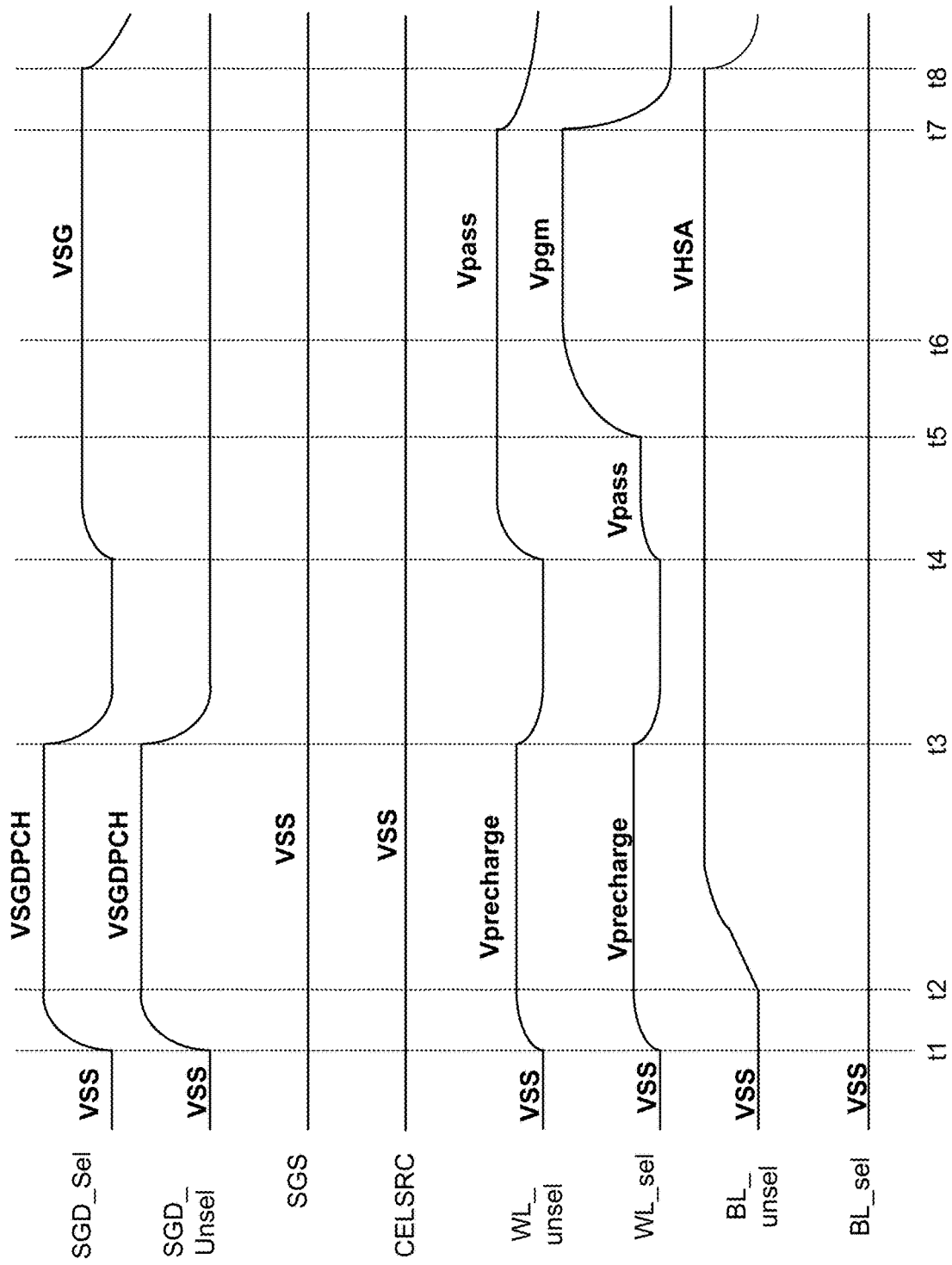
FIG. 7 depicts timing of voltages applied to various control lines in memory structure during program operations.

FIG. 7 depicts timing of voltages applied to various control lines in memory structure 202 during a loop of a program operation. The control lines are for a NAND example. The control line SGD_Sel refers to the selected SGD line, which could be one of SGD-s0, SGD-s1, SGD-s2, SGD-s3, or SGD-s4 in the example of FIG. 4E. The control line SGD_Unsel refers to the unselected SGD lines, which could be the other four of SGD-s0, SGD-s1, SGD-s2, SGD-s3, and/or SGD-s4 in the example of FIG. 4E. The control line SGS refers the source side select line such as SGS in FIG. 4E. The control line CELSRC refers to the source line such as SL in FIG. 4E. The control line WL_sel refers to the word line connected to the memory cells selected for programming (e.g., the selected WL) and could be any of, for example, WL0-WL111 in FIG. 4E. The control line WL_unsel refers to the unselected word lines, which may include all data word lines other than the selected word line. The control line BL_sel refers to the bit lines that are associated with NAND strings having a memory cell that is to receive programming for this program loop. The control line BL_unsel refers to the bit lines that are associated with NAND strings having a memory cell connected to the selected word line that is to be inhibited from programming at this time.

Prior to time t1 all control lines are at a steady state voltage (e.g., VSS or about 0V). At t1 the voltages on the selected and unselected SGDs are raised to VSGDPCH (a pre-charge channel voltage). At t1 the voltages on the selected and unselected WLs are raised to Vprecharge. At t2 the voltage on the unselected bit lines is raised to VHSA. VHSA is a voltage that inhibits programming of memory cells. VHSA could be about 2.2V. Between t2 to t3 the voltages on the SGDs and WLs are held at VSGDPCH and Vprecharge, respectively. In an embodiment, these voltages are used to pre-charge the NAND channels. At t3 the voltages on the SGDs and WLs are brought back down to VSS.

At t4 the voltage on the selected and unselected WLs are raised to a boosting voltage (Vpass). Also at t4 the voltage on the selected SGD is raised to a select voltage VSG. The boosting voltage Vpass on the unselected word line will couple up the NAND channel voltage (of unselected NAND strings) to inhibit programing of memory cells that are connected to the selected word line but are not to receive programming at this time. Note that the voltage on the selected bit lines stays at a program enable voltage (e.g., VSS or 0V) throughout the program loop. The program enable voltage will enable programming of a memory cell connected to the selected word line. In some embodiments, some of the selected bit lines will receive a voltage that is between the program enable voltage and the program inhibit voltage, which results in slower programming.

As noted above, at t4 the voltage on the selected WL is raised to Vpass. At t5 the voltage on the selected WL may continue to raise towards the program voltage Vpgm. The voltage on the selected WL reaches Vpgm by t6 and is held at Vpgm until t7. In an embodiment, the magnitude of Vpgm increases with each successive program loop. In an embodiment, Vpgm has a maximum allowed magnitude. The time between t6 and t7 is one example of the duration of the program pulse. In one embodiment, the time duration between t6 and t7 is increased in response to a program failure. In one embodiment, this increased time is applied to the same group that had the program failure. In one embodiment, this increased time is applied to a different group in the same erase block.

At t7, the voltages on the selected and unselected word lines is brought down to a steady state value. At t8 the voltages on the selected bit lines and SGD_sel are brought down to a steady state value.

Figure 8:
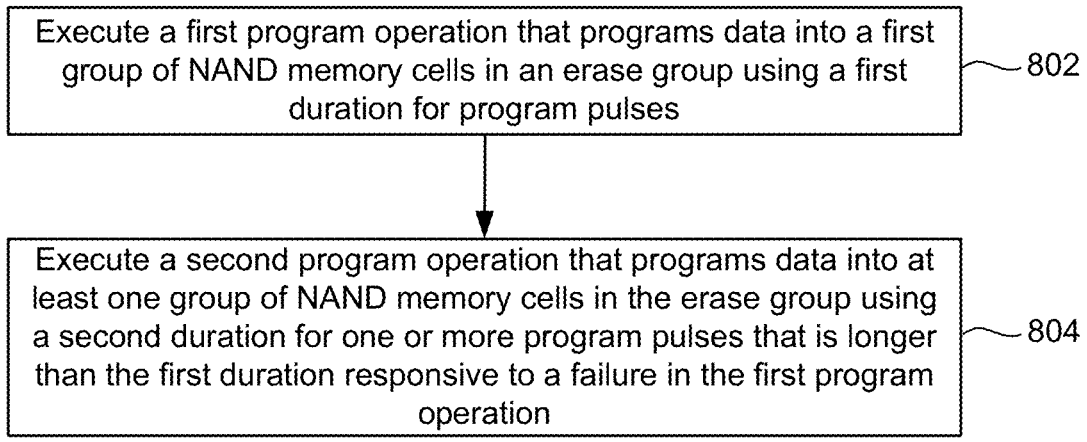
FIG. 8 is a flowchart of one embodiment of a process for programming NAND memory cells in which the duration of the program pulse may be increased in response to a program failure.

Embodiments include a memory system that programs NAND memory cells in which a duration of a program pulse may be increased responsive to a programming failure using a shorter (e.g., default) duration program pulse. FIG. 8 is a flowchart of one embodiment of a process 800 for programming NAND memory cells in which the duration of the program pulse may be increased in response to a program failure. In an embodiment, the process 800 is used when programming memory cells to multiple bits per cell. Typically, this involves programming multiple pages into a physical page of memory cells. When programming multiple pages into a physical page of memory cells one technique is to program all pages in one operation such as the direct programming depicted in FIG. 5B. However, programming can occur in multiple stages or phases, which could include programming one page at a time. For example, a lower page, middle page, and upper page may be programmed by different program operations. The process 800 may be performed by one or more control circuits including any one of or any combination of memory controller 120, state machine 262, power control 264, all or a portion of system control logic 260, all or a portion of row control circuitry 220, all or a portion of column control circuitry 210, read/write circuits 225, sense amps, a microcontroller, a microprocessor, and/or other similar functioned circuits.

Step 802 includes executing a first program operation that programs data into a first group of NAND memory cells. The first group of cells is part of an erase group that includes other memory cells that are not being programmed in step 802. As one example, the first group are connected to a selected word line in a block of memory cells. The block of memory cells might be erased together as an erase group, or some subset of the block might be erased together as an erase group. For example, memory cells in an upper tier may be erased separate from memory cells in a lower tier.

Figure 9:
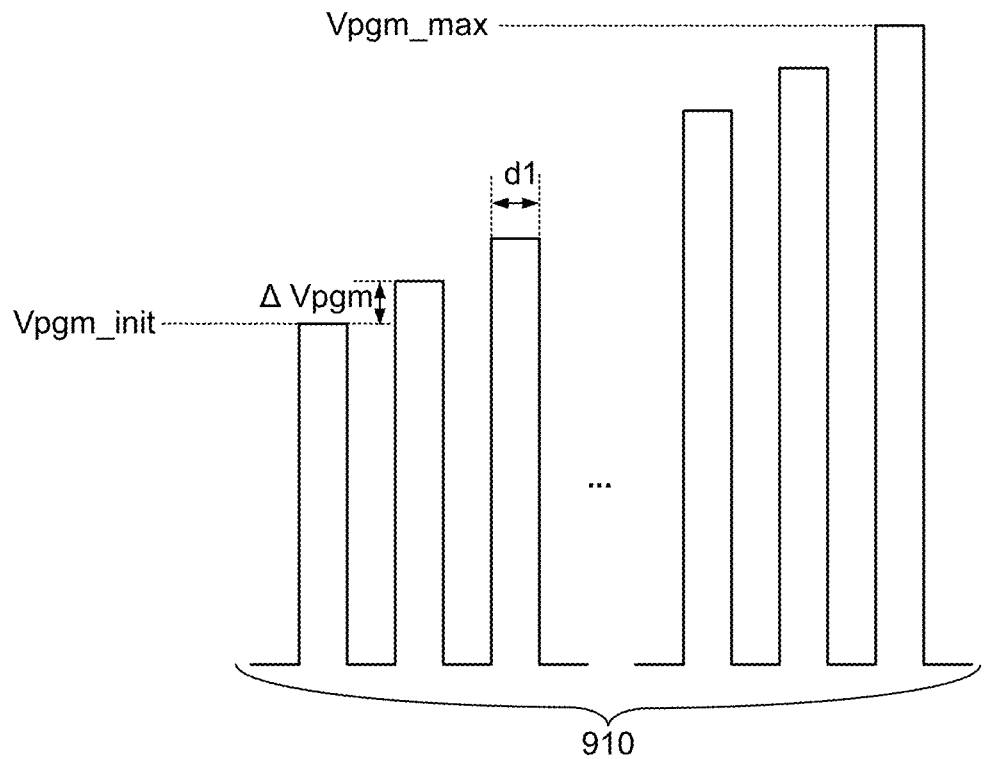
FIG. 9 shows one example of a series of program voltage pulses that increase in magnitude successively with each pulse having a first duration.

In one embodiment, the process in FIG. 6 is performed in step 802. In one embodiment, the process in FIG. 6 will directly program multiple pages into a physical page of memory cells (see example of FIG. 5B). In one embodiment, the process in FIG. 6 may be repeated to program multiple pages into a physical page of memory cells in a multi-stage (or multi-phase) technique. In an embodiment, the first program operation includes applying a series of program voltage pulses to a selected word line connected to the memory cells. The series of program voltage pulses may increase successively. For example, in the process of FIG. 6, the program voltage may be stepped up by ΔVpgm from one program loop to the next. FIG. 9 shows one example of a series of program voltage pulses 910 that increase in magnitude successively. The first program voltage pulse has a magnitude of Vpgm_init, with each pulse increasing by ΔVpgm from the previous pulse. Each pulse has a time duration of d1. This time duration may be specified in trim parameters. The series of program voltage pulses 910 has a maximum allowed magnitude (Vpgm_max). In an embodiment, Vpgm_max will be reached on the final allowed program loop.

The program operation in step 802 may complete with a status of either pass or fail. For example, the program operation depicted in FIG. 6 may end with a status of pass in step 614 or may end with a status of fail in step 624. Note that when ending with a status of fail in step 624 one case is for the memory cells to have experienced the maximum allowed program voltage (see the case in which step 620 is no, meaning that the loop count reached the maximum allowed loops and also that the maximum allowed program voltage was reached). However, another case is for the memory cells to not have experienced the maximum allowed program voltage (see the case in which step 622 is yes, meaning that the loop count did not reach the maximum allowed loops and also that the maximum allowed program voltage was not reached). Also note that the case in which step 622 is yes means that there was an early program termination, which is a type of program failure.

Step 804 includes executing a second program operation that programs data into at least one group of NAND memory cells using a second duration for one or more program pulses. The second duration is longer than the first duration used in step 802. Step 804 is performed in response to a failure of the first program operation. Thus, step 804 increases the duration of the program pulse responsive to a program failure using the first duration program pulse.

In one embodiment, step 804 includes programming the same group of memory cells that had the program failure in step 802. In one embodiment, step 804 includes programming a different group of memory cells than the group that had the program failure in step 802. However, in one embodiment, this other group is in the same erase group as the group that failed programming in step 802. By being in the same erase group it is meant that the memory system erases both of these groups at the same time. Moreover, memory cells in the same erase group, as defined herein, are in the same plane.

Figure 10A:
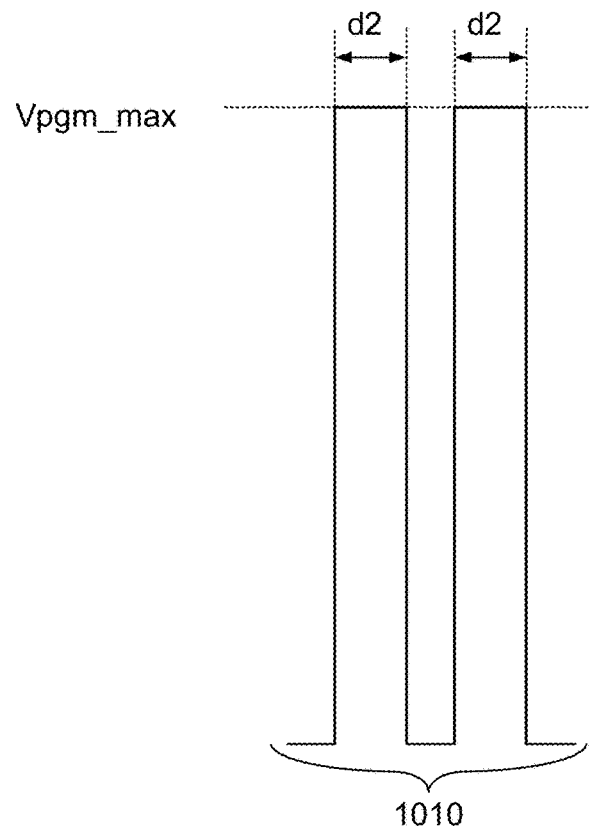
FIG. 10A depicts one example of one or more program voltage pulses that each have a second duration.

In an embodiment, the second program operation includes applying one or more program voltage pulses to a selected word line connected to the target memory cells to be programmed in step 804. FIG. 10A depicts a series of program voltage pulses 1010 that may be applied to the memory cells in one embodiment of step 804. Each of the program voltage pulses has a duration of d2, which is a longer time duration than d1 (see FIG. 9). In one embodiment, the magnitude of the one or more program voltage pulses used in step 804 does not increase from one pulse to the next. In one embodiment, the magnitude of the one or more program voltage pulses used in step 804 is equal to the magnitude of the final program pulse used in the first operation of step 804. In one embodiment, the magnitude of the one or more program voltage pulses used in step 804 is equal to the maximum allowed magnitude. The series of program voltage pulses 1010 is an example in which the magnitude of each pulse is equal to the maximum allowed magnitude (Vpgm_max). Although two program pulses are depicted in FIG. 10A, more generally there are one or more program pulses in an embodiment in which the program pulses each have the maximum allowed magnitude. In one embodiment, the series of one or more program voltage pulses, such as program voltage pulses 1010, is used to complete programming of a group that failed programming in step 802.

Figure 10B:
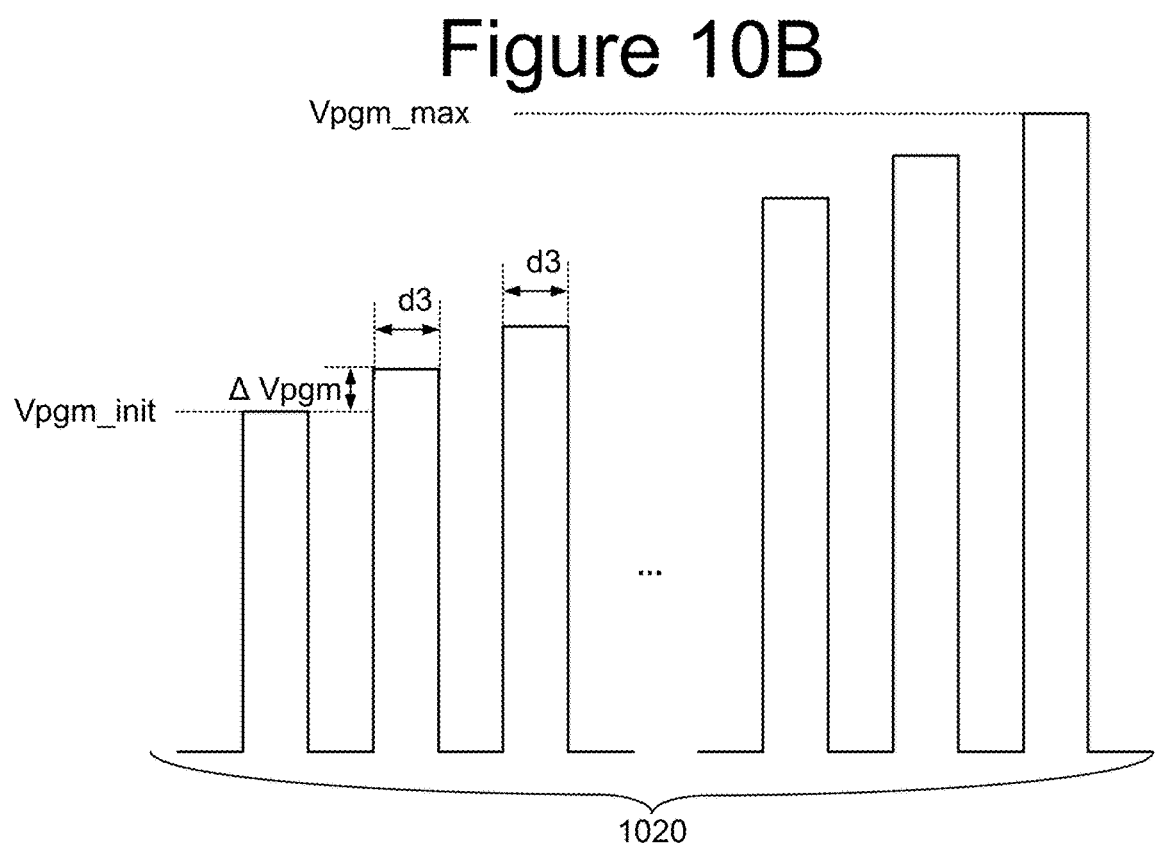
FIG. 10B depicts one example of one or more program voltage pulses that increase in magnitude successively with each pulse having a second duration.

In an embodiment, the second program operation of step 804 includes applying a plurality of program voltage pulses having successively increasing magnitudes to a selected word line connected to the target memory cells to be programmed in step 804. FIG. 10B depicts a series of program voltage pulses 1020 that may be applied to the memory cells in one embodiment of step 804. Each of the program voltage pulses has a duration of d3, which is a longer time duration than d1 (see FIG. 9). The time duration of d3 could be the same or different than d2. The magnitude of the program voltage pulses increases from one pulse to the next. In the example in FIG. 10B, the increase is ΔVpgm. The value for ΔVpgm could be the same as for the first operation, but this is not a requirement. In the example in FIG. 10B, the first pulse has a magnitude of Vpgm_init, which may have the same value as Vpgm_init for the first operation (see FIG. 9) but a different value for Vpgm_init could be used. In the example in FIG. 10B, the final pulse has a magnitude of Vpgm_max, which may have the same value as Vpgm_max for the first operation (see FIG. 9) but a different value for Vpgm_max could be used. The second program operation will not necessarily reach Vpgm_max in order to complete programming. In one embodiment, a series of successively increasing magnitude program voltage pulses, such as series 1020, is used to program a different set of memory cells than the group that failed programming in step 802. However, this other set of memory cells may be in the same erase block as the group that failed programming in step 802.

FIG. 11 is a flowchart of one embodiment of a process 1100 that may include applying one or more additional pulses having an increased duration to a group of memory cells to complete their programming. Process 1100 provides further details for one embodiment of process 800. Process 1100 may be used to complete the programming of a group that failed programming using the program pulses having the shorter (first or default) duration.

Step 1102 includes applying successively increasing magnitude program pulses, each having a first duration, to a group of memory cells. The program pulses may be applied to the selected word line connected to the group of memory cells. Step 1102 is performed in one embodiment of step 802 of process 800. Step 1102 may include performing one or more loops of the process in FIG. 6. FIG. 9 depicts one example of a series 910 of successively increasing magnitude program pulses each having a first duration.

Step 1104 includes a determination of whether programming resulted in a pass or a fail. In one embodiment, the program operation of step 1102 ends in a status of pass if a sufficient number of memory cells reached their target Vt (see step 618 in FIG. 6). If the status is pass, then process 1100 concludes with a status of pass in step 1106. In one embodiment, the program operation of step 1102 ends in a status of fail if there is a failure for a sufficient number of memory cells to reach their target Vt after the program voltage reaches the maximum allowed voltage (see step 620 in FIG. 6). In this case, step 1108 is performed. In some embodiments step 1108 will also be performed if there is an early program termination (see step 622 in FIG. 6). However, it is not a requirement to perform step 1108 upon an early program termination.

Step 1108 includes applying one or more additional program pulses, each having a second duration that is longer than the first duration, to the group. The program pulses may be applied to the selected word line connected to the group of memory cells. FIG. 10A depicts one example of a series 1010 of one or more additional program pulses each having a second duration. In one embodiment of step 1108 each of the one or more additional program pulses has the maximum allowed magnitude (e.g., Vpgm_max). In one embodiment, step 1108 includes performing steps 604 to 618 of FIG. 6.

Step 1110 includes a determination of whether the programming of step 1108 finished with a pass or fail status. Optionally, a maximum number of program loops can be established for step 1108 in which case if the fail bits are still greater than the predetermined limit (see step 618) after the allowed number of loops, then step 1108 could conclude with a status of fail. Thus, process 1100 may conclude with a status of pass (step 1112) or fail (step 1114).

Figure 12:
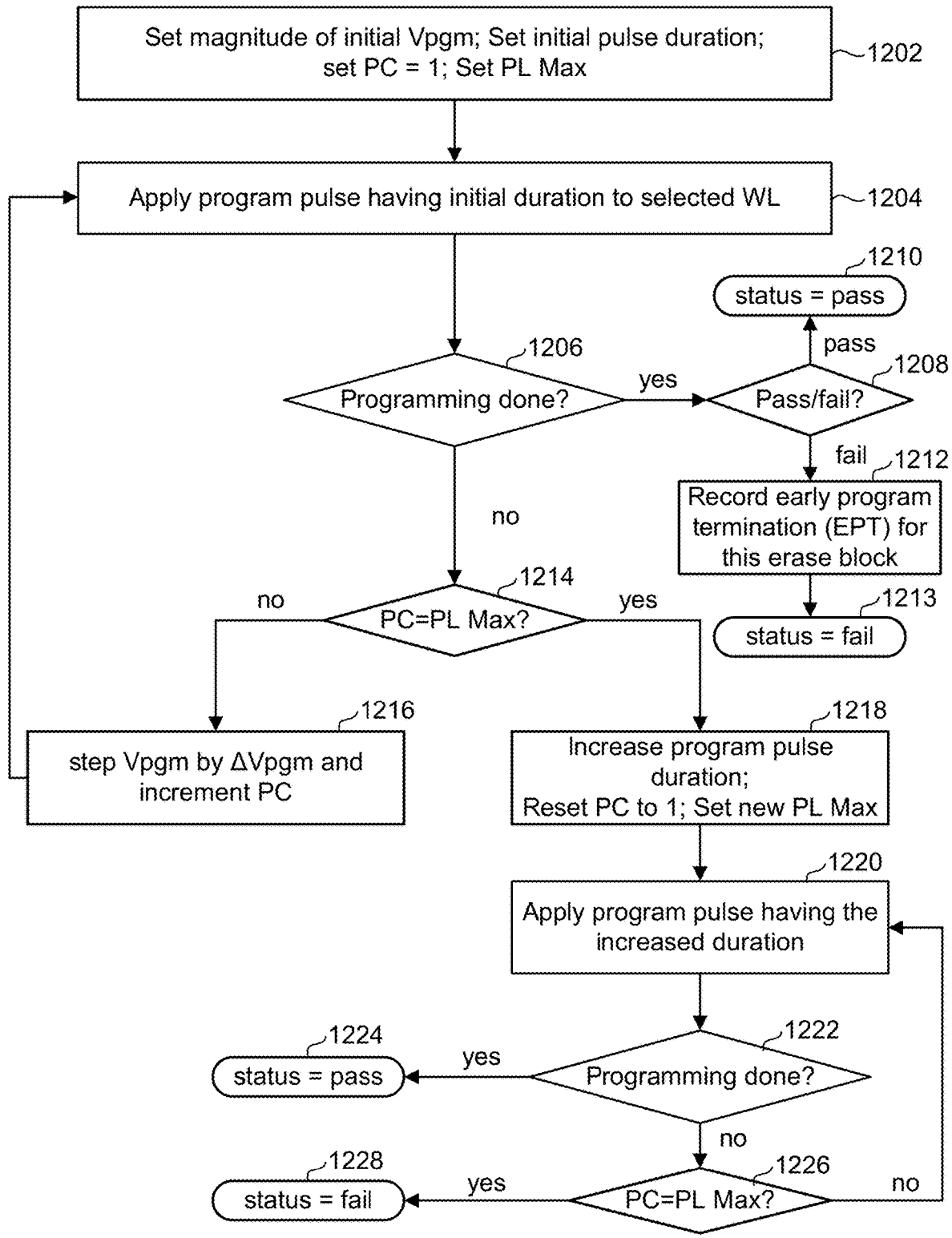
FIG. 12 is a flowchart of one embodiment of a process that pertains to increasing a program pulse duration responsive to a program failure using a shorter program pulse.

FIG. 12 is a flowchart of one embodiment of a process 1200 that pertains to increasing a program pulse duration responsive to a program failure using a shorter program pulse. Process 1200 provides further details for one embodiment of process 800.

Step 1202 includes setting the magnitude of an initial program pulse. Step 1202 also includes setting an initial program pulse duration. Step 1202 also includes setting a program loop counter (PC) to 1. Step 1202 also includes setting a value for a maximum loop count.

Step 1204 includes applying a program pulse having the initial duration to the selected WL that is connected to the target memory cells to be programmed. With reference to the timing of voltages in FIG. 7, Vpgm is applied between t6 and t7. Other voltages depicted in FIG. 7 may also be applied in step 1204.

Step 1206 includes a determination of whether programming is done. Step 1206 may include performing a program verify operation to determine whether the memory cells have reached their respective target threshold voltages, as has been previously described in connection with FIG. 6. Step 1206 may also include a determination of whether to terminate programming early (EPT) despite a failure of a sufficient number of memory cells to reach their respective target threshold voltages. Step 1208 is performed if programming is done. If programming completed with a status of pass, then in step 1210 the status of pass may be reported from the die (200, 211) to the memory controller 120. If programming completed with a status of fail, then in step 1212 the memory system may record that this group had an early program termination (EPT). This EPT may lead to increasing the program pulse duration for groups in the same erase block as the group having the EPT. However, it is not required that the program pulse duration be increased in response to a single group in the erase block having the EPT. In one embodiment, the program pulse duration is only increased for the erase block if a threshold number of groups in the erase block have an EPT. In step 1213 the status of fail may be reported from the die (200, 211) to the memory controller 120. In one embodiment, the memory controller 120 will instruct the die (200, 211) to program the data in a different group of memory cells due to the program failure.

If programming is not done (step 1206 is no), then step 1214 is performed. Step 1214 includes a determination of whether the PC equals the PL Max. This test will in effect test whether the maximum allowed program voltage has been applied to the memory cells being programmed in step 1204. If the PC does not equal the PL Max then the program voltage is increased by ΔVpgm and the PC is incremented by one in step 1216. Then step 1204 is performed again with the increased magnitude Vpgm. On the other hand, if the PC equals the PL Max this means that the maximum allowed program voltage has been applied, in which case step 1218 is performed. Step 1218 includes increasing the program pulse duration. Step 1218 also includes resetting the PC to 1, as well as establishing a new PL Max. This PL Max may be considerably lower than the PL Max in step 1202. Step 1222 includes applying the program pulse having the increased duration to the selected word line. Step 1222 is similar to step 1204 but has the longer duration program pulse. Thus, with respect to FIG. 7, the time between t6 and t7 is longer in step 1220 than in step 1204. Step 1222 is a determination of whether programming is complete, which may be similar to step 1206. If so, then the process 1200 ends with a status of pass in step 1224. The status of pass may be reported from the die (200, 211) to the memory controller 120. If programming is not complete, then in step 1226 the PC is compared to the PL Max. If the maximum number of program loops using the longer duration program pulse has been used then the process 1200 ends with a status of fail in step 1228. The status of fail may be reported from the die (200, 211) to the memory controller 120. Otherwise, step 1220 is again performed. However, note that there is no stepping up of Vpgm, as Vpgm is already at the maximum allowed voltage.

Figures 13, 14:
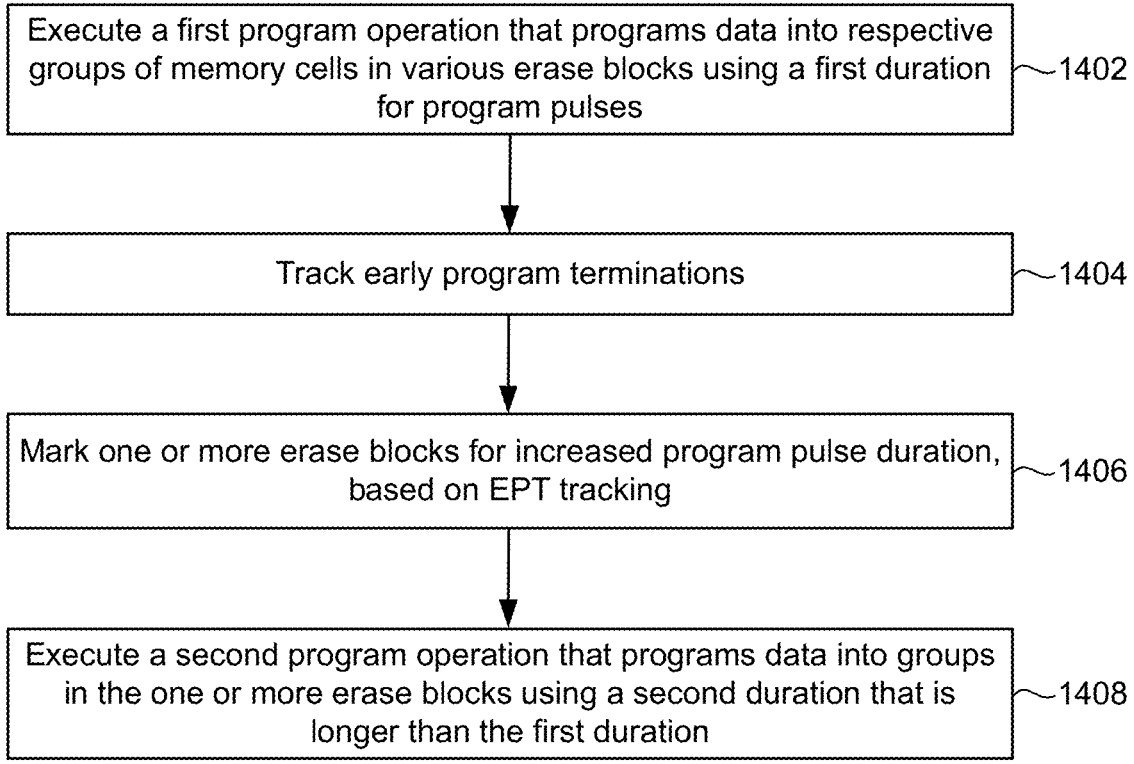
FIG. 13 depicts an example table that tracks early program termination on a block-by-block basis.
FIG. 14 is a flowchart of one embodiment of a process of increasing a program pulse duration for a block of memory cells responsive to one or more groups of cells in that block having a program failure.

In one embodiment, the memory system keeps track of early program terminations. The memory system may track this on a region-by-region basis, such as an erase block-by-erase block basis. This EPT tracking may be used to determine whether to increase the duration of the program pulse for the respective regions being tracked. FIG. 13 depicts an example table 1300 that tracks EPT on a erase block-by-erase block basis. The memory system does not need to store the table 1300 in one location, but the information could be distributed in many locations. For example, the erase blocks can each have metadata stored in some portion of the erase block, with some of the EPT information stored in the metadata. The table 1300 indicates that an EPT count is maintained for each erase block. In one embodiment, the EPT count for a block is incremented in step 1212 of process 1200. The table 1300 also specifies a program pulse duration for each erase block. The length of the program pulse may be specified by a code, such as a three-bit code, four-bit code, or some other number of bits code. There may be a default duration that is used in the first programming operation of step 802 of process 800. Table 1300 shows that the duration for erase block 1 has been set to Long, which in one embodiment is done in response to the EPT count for that block reaching a threshold.

FIG. 14 is a flowchart of one embodiment of a process 1400 of increasing a program pulse duration for an erase block of memory cells responsive to one or more groups of cells in that erase block having a program failure. In an embodiment, the program failure is an early program termination (EPT), which occurs prior to a maximum allowed magnitude of the program voltage being applied to the group. Step 1402 includes executing a first program operation that programs data into respective groups of memory cells in the erase block using a first duration for program pulses. This has been discussed with respect to step 802 of process 800.

Step 1404 includes tracking early program failures. An early program failure is defined herein as terminating a program operation before all but a pre-determined number of cells reached their respective target Vts and before a maximum allowed program voltage has been applied to the cells. In an embodiment, early program failures are tracked on an erase block-by-erase block basis, but tracking could be based on some other collection of groups of memory cells that are typically programmed as a unit (such as pages of memory cells).

Step 1406 includes determining to mark one or more erase blocks for increased program pulse duration, based on the EPT tracking. Step 1408 includes executing a second program operation that programs data into groups in the one or more erase blocks using a second duration for the program pulses that is longer than the first duration.

In view of the foregoing, a first embodiment includes an apparatus comprising one or more control circuits configured to connect to a memory structure comprising a plurality of erase blocks having NAND memory cells. The one or more control circuits are configured to execute a first program operation that programs data into respective groups of memory cells with program pulses each having a first duration. The one or more control circuits are configured to, responsive to a failure of the first program operation of a first group of the memory cells in a first erase block of the plurality of erase blocks, execute a second program operation that programs data into at least one group of the memory cells in the first erase block with one or more program pulses each having a second duration that is longer than the first duration.

In a second embodiment, in furtherance to the first embodiment, to execute the first program operation the one or more control circuits apply a plurality of program pulses each having the first duration at successively increasing magnitudes to the first group of the memory cells to begin to program first data into the first group. To execute the second program operation the one or more control circuits apply at least one additional program pulse having the second duration to continue to program the first data into the first group.

In a third embodiment, in furtherance to the first or second embodiments, the program pulses of the first program operation have a maximum allowed magnitude that is reached after a pre-determined number of the program pulses having the first duration. The at least one additional program pulse applied to the first group of memory cells has the maximum allowed magnitude.

In a fourth embodiment, in furtherance to any of the first to third embodiments, to execute the first program operation the one or more control circuits apply a plurality of program pulses each having the first duration at successively increasing magnitudes to the first group of the memory cells. The failure of the first program operation occurs after the magnitude of the successively increasing magnitudes has reached a maximum allowed magnitude.

In a fifth embodiment, in furtherance to any of the first to third embodiments, to execute the first program operation the one or more control circuits apply a plurality of program pulses each having the first duration at successively increasing magnitudes to the first group of the memory cells. The one or more control circuits are configured to terminate the first program operation prior to the magnitude of the program pulses reaching a maximum allowed magnitude thereby resulting in the failure of the first program operation.

In a sixth embodiment, in furtherance the any of the first to fifth embodiments, to execute the first program operation the one or more control circuits apply a plurality of program pulses having the first duration at successively increasing magnitudes to the first group of the memory cells, the successively increasing magnitudes having a maximum allowed magnitude. To execute the second program operation in response to the failure of the first program operation the one or more control circuits apply a plurality of program pulses having the second duration at successively increasing magnitudes to program data into a second group of memory cells in the first erase block.

In a seventh embodiment, in furtherance the sixth embodiment, the one or more control circuits are configured to erase the first group of memory cells and the second group of memory cells together.

In an eighth embodiment, in furtherance to any of the first to seventh embodiments, the one or more control circuits are further configured to store a program pulse duration to be used for each of the plurality of erase blocks. The one or more control circuits are further configured to track early program terminations of the plurality of erase blocks. The early program termination of a respective group being a termination of the first program operation before the program pulses in the first program operation reach a maximum allowed magnitude despite data not yet being successfully programmed into the respective group. The one or more control circuits are further configured to increase the program pulse duration to be used for a particular erase block of the plurality of erase blocks responsive to early termination of the first program operation in the particular erase block.

In a ninth embodiment, in furtherance to any of the first to eighth embodiments, the apparatus further comprises a first semiconductor die that comprises the memory structure, and a second semiconductor die that comprises the one or more control circuits. The second semiconductor die is bonded to the first semiconductor die.

One embodiment includes a method for programming NAND memory. The method comprises applying a plurality of program pulses each having a first duration at successively increasing magnitudes to a selected group of NAND memory cells in an erase block having a plurality of groups of NAND memory cells. The method comprises, responsive to a failure to successfully program data into the selected group of the NAND memory cells after the plurality of program pulses, applying at least one program pulse having a second duration to at least one group of memory cells in the erase block to successfully program data into the at least one group of memory cells, wherein the second duration is longer than the first duration.

One embodiment includes a non-volatile storage system comprising a memory structure having blocks having NAND strings. The non-volatile storage system comprises first means for applying a plurality of program pulses each having a first duration at successively increasing magnitudes to a first group of memory cells in a selected block. The non-volatile storage system comprises second means for applying at least one program pulse having a second duration to at least one group of memory cells in the selected block to successfully program data into the at least one group of memory cells responsive to a failure to successfully program data into the first group of the memory cells after the plurality of program pulses having the first duration, wherein the second duration is longer than the first duration.

In one embodiment, the first means includes any combination of memory controller 120, state machine 262, power control 264, all or a portion of system control logic 260, all or a portion of row control circuitry 220, all or a portion of column control circuitry 210, read/write circuits 225, sense amps, a microcontroller, a microprocessor, and/or other similar functioned circuits. In one embodiment, the first means includes any combination of a processor, Field Programmable Gate Array (FPGA), Application Specific Integrated Circuit (ASIC), integrated circuit, or other type of circuit. In one embodiment, the first means performs the process of FIG. 6. In one embodiment, the first means performs steps 1202, 1204, 1214, and 1216 in process 1200.

In one embodiment, the second means includes any combination of memory controller 120, state machine 262, power control 264, all or a portion of system control logic 260, all or a portion of row control circuitry 220, all or a portion of column control circuitry 210, read/write circuits 225, sense amps, a microcontroller, a microprocessor, and/or other similar functioned circuits. In one embodiment, the second means includes any combination of a processor, Field Programmable Gate Array (FPGA), Application Specific Integrated Circuit (ASIC), integrated circuit, or other type of circuit. In one embodiment, the first means performs the process of FIG. 6. In one embodiment, the second means performs steps 1218, 1220, 1222, and 1226 in process 1200.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via one or more intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus comprising:
one or more control circuits configured to connect to a memory structure comprising a plurality of erase blocks having NAND memory cells, wherein the one or more control circuits are configured to:
store, for each respective erase block of the plurality of erase blocks, information that indicates whether memory cells in the respective erase block are to be programmed with program pulses having a first duration or a second duration that is longer than the first duration;
execute a first program operation that programs data into respective groups of memory cells with program pulses each having the first duration for the erase blocks for which the information indicates the first duration;
track early program terminations in the erase blocks programmed using the program pulses having the first duration, the early program termination being a termination of the first program operation before the program pulses having the first duration reach a maximum allowed magnitude despite data not yet being successfully programmed into the respective group;
report the early program terminations to a memory controller as program failures;
update the information to indicate that the second duration for the program pulses is to be used for erase blocks having more than a threshold number of early program terminations when using program pulses having the first duration; and
execute a second program operation that programs data into respective groups of the memory cells with program pulses each having the second duration for the erase blocks for which the information indicates the second duration is to be used.

2. The apparatus of claim 1, wherein:
to execute the first program operation the one or more control circuits apply a plurality of program pulses each having the first duration at successively increasing magnitudes to a first group of the memory cells in a first erase block of the erase blocks for which the information indicates the first duration; and
the one or more control circuits are configured to terminate the first program operation prior to the magnitude of the program pulses reaching the maximum allowed magnitude thereby resulting in the early program termination of the first program operation.

3. The apparatus of claim 1, wherein:
to execute the first program operation the one or more control circuits apply the program pulses having the first duration at successively increasing magnitudes to respective groups of the memory cells in a first erase block of the erase blocks for which the information indicates the first duration; and
to execute the second program operation in response to the early program terminations of the first program operation to the respective groups in the first erase block exceeding the threshold number the one or more control circuits apply the program pulses having the second duration at successively increasing magnitudes to program data into respective groups of memory cells in the first erase block including groups that did not have an early program termination for the first program operation.

4. The apparatus of claim 3, wherein the one or more control circuits are configured to:
erase the first group of memory cells and the second group of memory cells together.

5. The apparatus of claim 1, wherein the apparatus further comprises:
a first semiconductor die that comprises the memory structure; and
a second semiconductor die that comprises the one or more control circuits, wherein the second semiconductor die is bonded to the first semiconductor die.

6. The apparatus of claim 1, wherein:
to execute the first program operation the one or more control circuits apply the program pulses each having the first duration at successively increasing magnitudes to respective groups of the memory cells in a first erase block of the erase blocks for which the information indicates the first duration; and
to execute the second program operation in response to the early program terminations of the first program operation to the respective groups in the first erase block exceeding the threshold number the one or more control circuits apply the program pulses each having the second duration each have the maximum allowed program voltage into respective groups of memory cells in the first erase block including groups that did not have an early program termination for the first program operation.

7. A method for programming NAND memory, the method comprising:
storing, for each respective erase block of a plurality of erase blocks, information that indicates whether memory cells in the respective erase block are to be programmed with program pulses having a first duration or a second duration that is longer than the first duration, each erase block having a plurality of groups of NAND memory cell;
applying program pulses each having the first duration at successively increasing magnitudes to respective groups of NAND memory cells in the erase blocks for which the information indicates the first duration should be used;
tracking early program terminations in the erase blocks programmed using the program pulses having the first duration, the early program termination being a program termination before the program pulses having the first duration reach a maximum allowed magnitude despite data not yet being successfully programmed into the respective group;
reporting the early program terminations to a memory controller as program failures;
updating the information to indicate that the second duration for the program pulses is to be used for erase blocks having more than a threshold number of early program terminations when using program pulses having the first duration; and
applying program pulses each having the second duration to respective groups of memory cells in the erase blocks for which the information indicates the second duration is to be used.

8. The method of claim 7, further comprising:
terminating programming of a first group of the NAND memory cells in a first of the erase blocks for which the information indicates the first duration should be used prior to the program pulses each having the first duration reaching the maximum allowed magnitude, wherein the program pulses each having the second duration at successively increasing magnitudes are applied to a second group of memory cells in the first erase block responsive to the terminating programming of the first group of the NAND memory cells.

9. The method of claim 8, further comprising:
erasing the plurality of groups of NAND memory cells in the first erase block as a unit after the terminating programming of the first group of the NAND memory cells; and
applying the program pulses each having the second duration to respective groups of memory cells in the first erase block after erasing the plurality of groups of NAND memory cells in the first erase block.

10. The method of claim 7, wherein the program pulses each having the second duration each have the maximum allowed program voltage.

11. The method of claim 7, wherein applying program pulses each having the second duration to respective groups of memory cells in the erase blocks for which the information indicates the second duration comprises:
applying a plurality of program pulses each having the second duration at successively increasing magnitudes.

12. The method of claim 7, wherein applying program pulses each having the second duration to respective groups of memory cells in the erase blocks for which the information indicates the second duration comprises:
applying a plurality of program pulses each having the second duration at successively increasing magnitudes; and
verifying programming following each of the plurality of program pulses each having the second duration.

13. A non-volatile storage system comprising:
a memory structure having erase blocks having NAND strings having memory cells;
means for storing, for each erase respective block in the memory structure, information that indicates whether memory cells in the respective erase block are to be programmed with program pulses having a first duration or a second duration that is longer than the first duration;
means for applying a plurality of program pulses each having the first duration at successively increasing magnitudes to respective groups of memory cells in the erase blocks for which the information indicates the first duration should be used;
means for tracking early program terminations in the erase blocks programmed using the program pulses having the first duration, the early program termination being a program termination before the program pulses having the first duration reach a maximum allowed magnitude despite data not yet being successfully programmed into the respective group;
means for reporting the early program terminations to a memory controller as program failures;
means for updating the information to indicate that the second duration for the program pulses is to be used for erase blocks having more than a threshold number of early program terminations when using program pulses having the first duration; and
means for applying a plurality of program pulses each having the second duration to respective groups of memory cells in the erase blocks for which the information indicates the second duration is to be used.

* * * * *